US012104228B2

(12) United States Patent
Kobayashi et al.

(10) Patent No.: US 12,104,228 B2
(45) Date of Patent: Oct. 1, 2024

(54) ALUMINUM ALLOY PLATE, TERMINAL, ELECTRIC WIRE WITH TERMINAL, AND BUS BAR

(71) Applicants: Sumitomo Electric Industries, Ltd., Osaka (JP); Sumitomo Wiring Systems, Ltd., Mie (JP); AutoNetworks Technologies, Ltd., Mie (JP)

(72) Inventors: Ryohei Kobayashi, Osaka (JP); Toru Maeda, Osaka (JP); Tetsuya Kuwabara, Osaka (JP); Masashi Fujiki, Yokkaichi (JP); Akihiro Hayashi, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 18/556,063

(22) PCT Filed: Jan. 31, 2022

(86) PCT No.: PCT/JP2022/003694
§ 371 (c)(1),
(2) Date: Oct. 18, 2023

(87) PCT Pub. No.: WO2022/244315
PCT Pub. Date: Nov. 24, 2022

(65) Prior Publication Data

US 2024/0084425 A1 Mar. 14, 2024

(30) Foreign Application Priority Data

May 20, 2021 (JP) ................................ 2021-085674

(51) Int. Cl.
*C22C 21/08* (2006.01)
*H01R 13/03* (2006.01)

(52) U.S. Cl.
CPC ............ *C22C 21/08* (2013.01); *H01R 13/03* (2013.01)

(58) Field of Classification Search
CPC ................................ C22C 21/08; H01R 13/03
(Continued)

(56) References Cited

U.S. PATENT DOCUMENTS

2010/0307645 A1 12/2010 Zhao et al.

FOREIGN PATENT DOCUMENTS

EP 3116069 A1 1/2017
JP 2000144291 A * 5/2000
(Continued)

OTHER PUBLICATIONS

English language machine translation of JP-2000144291-A. Generated Jan. 24, 2024. (Year: 2024).*
(Continued)

*Primary Examiner* — Brian D Walck
(74) *Attorney, Agent, or Firm* — Volpe Koenig

(57) ABSTRACT

The aluminum alloy in the cross-section of the surface layer region of the aluminum alloy plate contains a compound containing one or more elements selected from the group consisting of silicon, magnesium, iron, copper, manganese, chromium, zinc, zirconium, and titanium, and aluminum. The number of fields of view containing the compound having an equivalent circle diameter of 5 μm or more out of 10 fields of view extracted from the cross-section is 3 or less. In the cross-section, the number density of the compound having an equivalent circle diameter of 1.5 μm or more and less than 5.0 μm is 0.0010 per $\mu m^2$ or less, and the area ratio
(Continued)

of the compound having an equivalent circle diameter of 0.5 μm or more is 0.1% or more and less than 1.0%.

11 Claims, 5 Drawing Sheets

(58) Field of Classification Search
USPC .......................................................... 420/546
See application file for complete search history.

(56) References Cited

FOREIGN PATENT DOCUMENTS

| | | | | |
|---|---|---|---|---|
| JP | 2003-268472 | A | | 9/2003 |
| JP | 2007077472 | A | * | 3/2007 |
| JP | 2008179838 | A | * | 8/2008 |
| JP | 2008190022 | A | * | 8/2008 |
| JP | 2008266684 | A | * | 11/2008 |
| JP | 2009167464 | A | * | 7/2009 |
| JP | 2013-257944 | A | | 12/2013 |
| JP | 2017-128758 | A | | 7/2017 |
| WO | 2009/098732 | A1 | | 8/2009 |
| WO | 2013/065583 | A1 | | 5/2013 |
| WO | 2015/133588 | A1 | | 9/2015 |

OTHER PUBLICATIONS

English language machine translation of JP-2008179838-A. Generated Jan. 24, 2024. (Year: 2024).*
English language machine translation of JP-2007077472-A. Generated Jan. 24, 2024. (Year: 2024).*
English language machine translation of JP-2008266684-A. Generated Jan. 24, 2024. (Year: 2024).*
English language machine translation of JP-2008190022-A. Generated Jan. 24, 2024. (Year: 2024).*
English language machine translation of JP-2009167464-A. Generated Jan. 24, 2024. (Year: 2024).*

* cited by examiner

ALUMINUM ALLOY PLATE, TERMINAL, ELECTRIC WIRE WITH TERMINAL, AND BUS BAR

TECHNICAL FIELD

The present disclosure relates to an aluminum alloy plate, a terminal, an electric wire with terminal, and a bus bar.

This application claims the priority based on Japanese Patent Application No. 2021-085674 filed on May 20, 2021, the entire content of which is incorporated herein by reference.

BACKGROUND ART

Terminals and bus bars are conventionally used as metal fittings to connect conductors. The terminal is attached to the end of an electric wire to connect a conductor of the electric wire with a predetermined object. The terminal has a connection portion connected to the object and a wire barrel portion that grips the conductor of the electric wire. The bus bar is connected to a conductor by a bolt. Conventionally, terminals and bus bars composed of copper-based materials such as brass have been widely used. PTLs 1 and 2 disclose terminals made of aluminum alloy as terminals that are lighter in mass than terminals composed of copper-based materials.

CITATION LIST

Patent Literature

PTL 1: Japanese Patent Laying-Open No. 2013-257944
PTL 2: WO 2013/065583

SUMMARY OF INVENTION

The aluminum alloy plate of the present disclosure is an aluminum alloy plate made of an aluminum alloy, the aluminum alloy containing 0.01 mass % or more and 1.50 mass % or less of silicon, 0.01 mass % or more and 2.00 mass % or less of magnesium, 0 mass % or more and 1.50 mass % or less of iron, 0 mass % or more and 1.50 mass % or less of copper, 0 mass % or more and 1.50 mass % or less of manganese, 0 mass % or more and 1.50 mass % or less of chromium, 0 mass % or more and 1.50 mass % or less of zinc, 0 mass % or more and 1.50 mass % or less of zirconium, and 0 mass % or more and 1.50 mass % or less of titanium, with the balance being aluminum and inevitable impurities. The aluminum alloy in a cross-section of a surface layer region of the aluminum alloy plate contains a compound containing one or more elements selected from the group consisting of silicon, magnesium, iron, copper, manganese, chromium, zinc, zirconium, and titanium, and aluminum. The number of fields of view containing the compound having an equivalent circle diameter of 5 μm or more out of 10 fields of view extracted from the cross-section is 3 or less. The number density of the compound having an equivalent circle diameter of 1.5 μm or more and less than 5.0 μm is 0.0010 per $\mu m^2$ or less. The area ratio of the compound having an equivalent circle diameter of 0.5 μm or more is 0.1% or more and less than 1.0%.

The terminal of the present disclosure is formed from the aluminum alloy plate of the present disclosure.

The electric wire with terminal of the present disclosure comprises an electric wire and the terminal of the present disclosure.

The bus bar of the present disclosure is formed from the aluminum alloy plate of the present disclosure.

DETAILED DESCRIPTION

Figure 1A:
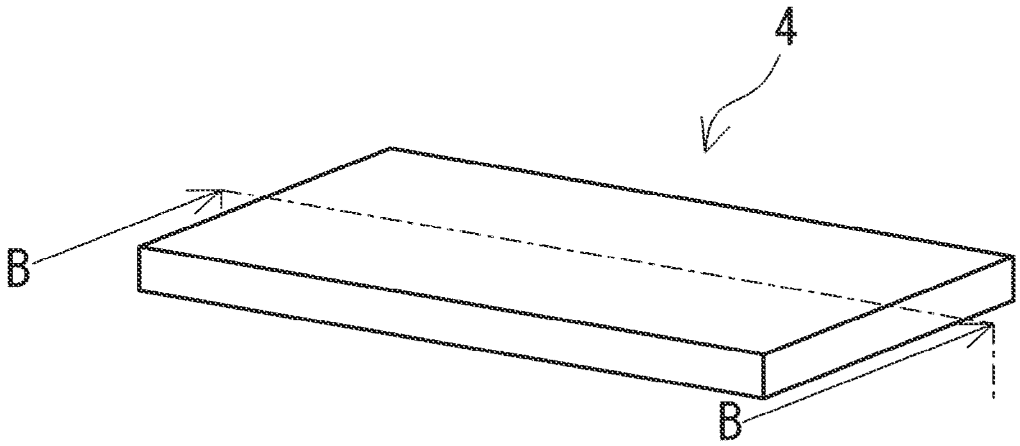
FIG. 1A is a perspective view illustrating one example of the aluminum alloy plate of an embodiment.

Problem to be Solved by the Present Disclosure

Aluminum alloy plates that are excellent in strength and also excellent in bending workability are desired. Terminals and bus bars composed of an aluminum alloy and excellent in strength and also excellent in bending workability are desired.

Aluminum alloys are superior in strength to pure aluminum because they contain additive elements in addition to pure aluminum. In particular, aluminum alloys containing silicon and magnesium as additive elements are excellent in strength among other types of aluminum alloys. However, high-strength aluminum alloys are more prone to cracking than pure aluminum or brass when subjected to bending working.

Accordingly, it is an object of the present disclosure to provide an aluminum alloy plate that is excellent in strength and also excellent in bending workability. It is another object of the present disclosure to provide a terminal and a bus bar that are excellent in strength and also excellent in bending workability. It is also another object of the present disclosure to provide an electric wire with terminal including the above terminal.

Advantageous Effect of the Present Disclosure

The aluminum alloy plate of the present disclosure, the terminal of the present disclosure, and the bus bar of the present disclosure are excellent in strength and also excellent in bending workability. The terminal included in the electric wire with terminal of the present disclosure is excellent in strength and also excellent in bending workability.

DESCRIPTION OF EMBODIMENTS OF THE PRESENT DISCLOSURE

First, aspects of the present disclosure are listed and described below.

(1) The aluminum alloy plate according to one aspect of the present disclosure is an aluminum alloy plate made of an aluminum alloy, the aluminum alloy containing 0.01 mass % or more and 1.50 mass % or less of silicon, 0.01 mass % or more and 2.00 mass % or less of magnesium, 0 mass % or more and 1.50 mass % or less of iron, 0 mass % or more and 1.50 mass % or less of copper, 0 mass % or more and 1.50 mass % or less of manganese, 0 mass % or more and 1.50 mass % or less of chromium, 0 mass % or more and 1.50 mass % or less of zinc, 0 mass % or more and 1.50 mass % or less of zirconium, and 0 mass % or more and 1.50 mass % or less of titanium, with the balance being aluminum and inevitable impurities. The aluminum alloy in a cross-section of a surface layer region of the aluminum alloy plate contains a compound containing one or more elements selected from the group consisting of silicon, magnesium, iron, copper, manganese, chromium, zinc, zirconium, and titanium, and aluminum. The number of fields of view containing the compound having an equivalent circle diameter of 5 μm or more out of 10 fields of view extracted from the cross-section is 3 or less. The number density of the compound having an equivalent circle diameter of 1.5 μm or more and less than 5.0 μm is 0.0010 per $\mu m^2$ or less. The area ratio of the compound having an equivalent circle diameter of 0.5 μm or more is 0.1% or more and less than 1.0%.

The inevitable impurities here are elements other than silicon, magnesium, iron, copper, manganese, chromium, zinc, zirconium, and titanium, and the like.

Here, the surface layer region of the aluminum alloy plate is a region from the surface of the aluminum alloy plate to 200 μm in the thickness direction of the aluminum alloy plate toward the interior of the aluminum alloy plate.

Details of the methods for measuring the equivalent circle diameter, the number density, the area ratio, and the average aspect ratio described below of the compound are described later.

Since the aluminum alloy plate of the present disclosure is made of the aluminum alloy having the above specific composition and the above specific structure, the aluminum alloy plate of the present disclosure has a higher hardness compared to a plate made of pure aluminum. In general, the higher the hardness of the metal plate, the higher the strength of the metal plate tends to be. Thus, the aluminum alloy plate of the present disclosure is excellent in strength.

Further, the aluminum alloy plate of the present disclosure has superior bending workability compared to a plate made of an aluminum alloy having the specific composition described above but not the specific structure described above. This is because, although the aluminum alloy constituting the aluminum alloy plate of the present disclosure contains the above compound, the above compound is difficult to become a starting point of cracking and wrinkles. In the aluminum alloy plate of the present disclosure, the reduction in toughness caused by the above compound is suppressed. Thus, the aluminum alloy plate of the present disclosure is suitable for a material of members subjected to bending working, such as a terminal or a housing.

(2) In the aluminum alloy plate of the present disclosure, the average aspect ratio of the compound having an equivalent circle diameter of 1.0 μm or more and less than 1.5 μm may be 2.5 or less.

The above-described aluminum alloy plate is excellent in bending workability compared to an aluminum alloy plate having an average aspect ratio of more than 2.5.

(3) In the aluminum alloy plate of the present disclosure, the Vickers hardness may be 70 HV or more.

The above-described aluminum alloy plate is excellent in strength compared to an aluminum alloy plate having the Vickers hardness of less than 70 HV.

(4) In the aluminum alloy plate of the present disclosure, the Vickers hardness may be 72 HV or more and 160 HV or less.

The above-described aluminum alloy plate is excellent in strength compared to an aluminum alloy plate having the Vickers hardness of less than 72 HV. In addition, the aluminum alloy plate above is excellent in bending workability compared to an aluminum alloy plate having the Vickers hardness of more than 160 HV.

(5) In the aluminum alloy plate of the present disclosure, the conductivity may be 40% IACS or more and 63% IACS or less.

The above-described aluminum alloy plate is excellent in conductivity compared to an aluminum alloy plate having the conductivity of less than 40% IACS. The aluminum alloy plate as such is suitable for a material of a terminal. In addition, the above-described aluminum alloy plate is also excellent in manufacturability compared to an aluminum alloy plate having the conductivity of more than 63% IACS.

(6) In the aluminum alloy plate of the present disclosure, the content of each element selected from the group consisting of iron, copper, manganese, chromium, zinc, zirconium, and titanium may be 0.01 mass % or more.

The above-described aluminum alloy plate contains 0.01 mass % or more of the elements selected from the above group in addition to silicon and magnesium, which makes the aluminum alloy plate excellent in strength compared to when it does not contain the elements selected from the above group. In addition, the above-described aluminum alloy plate is excellent in conductivity compared to when it does not contain the elements selected from the above group, because the compound is more likely to be formed.

(7) In the aluminum alloy plate of the present disclosure, the aluminum alloy may be an alloy defined by international alloy designation 6056. The Vickers hardness may be 72 HV or more. The conductivity may be 40% IACS or more and 53% IACS or less.

The above-described aluminum alloy plate is excellent in strength and conductivity and also excellent in manufacturability, as described in items (3) to (5) described above.

(8) The terminal according to one aspect of the present disclosure is formed from the aluminum alloy plate according to any one of (1) to (7) described above.

The terminal of the present disclosure substantially maintains the composition and structure of the aluminum alloy constituting the aluminum alloy plate of the present disclosure. Thus, the terminal of the present disclosure is excellent in strength and also excellent in bending workability.

(9) The electric wire with terminal according to one aspect of the present disclosure includes an electric wire and the terminal of the present disclosure.

The electric wire with terminal of the present disclosure includes the terminal of the present disclosure that is excellent in strength, so that the contact resistance can be reduced and the electrical connection state can be maintained for a long time. The electric wire with terminal of the present disclosure is also excellent in manufacturability because it includes the terminal of the present disclosure that is excellent in bending workability.

(10) The bus bar according to one aspect of the present disclosure is formed from the aluminum alloy plate according to any one of (1) to (7) described above.

The bus bar of the present disclosure substantially maintains the composition and structure of the aluminum alloy constituting the aluminum alloy plate of the present disclosure. Thus, the bus bar of the present disclosure is excellent in strength and also excellent in bending workability. In addition, the bus bar of the present disclosure can reduce contact resistance and maintain the electrical connection state for a long time.

DETAILS OF EMBODIMENTS OF PRESENT DISCLOSURE

With reference to figures, embodiments of the present disclosure are described in detail below. In the figures, the same sign indicates those having the same name.

[Aluminum Alloy Plate]

Figure 1B:
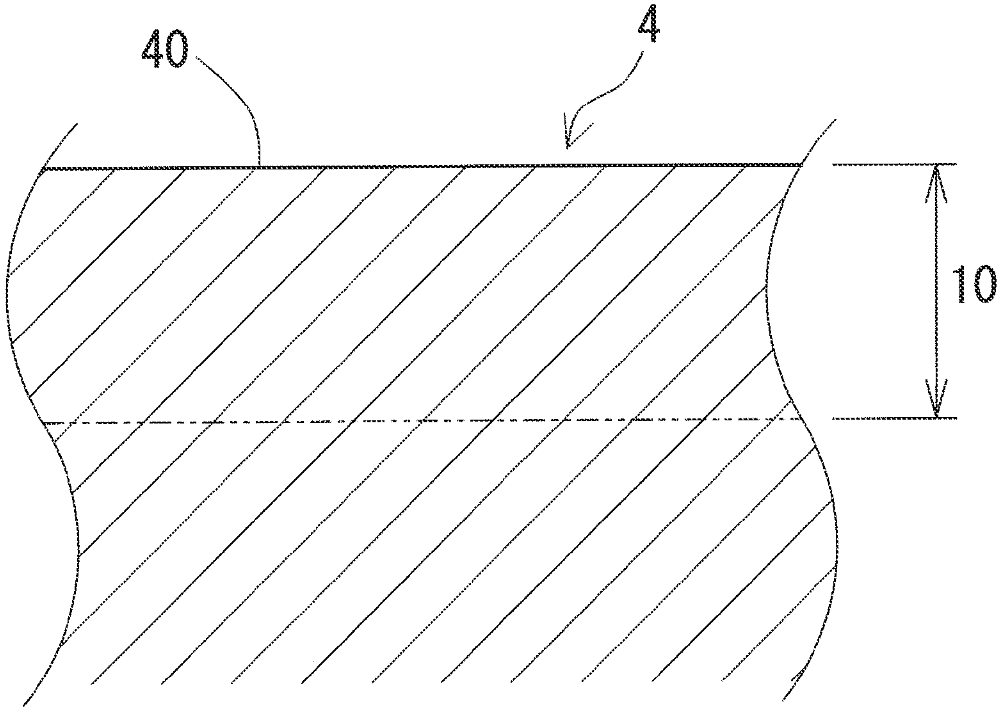
FIG. 1B is a B-B cross-sectional view of FIG. 1A.
Figure 2:
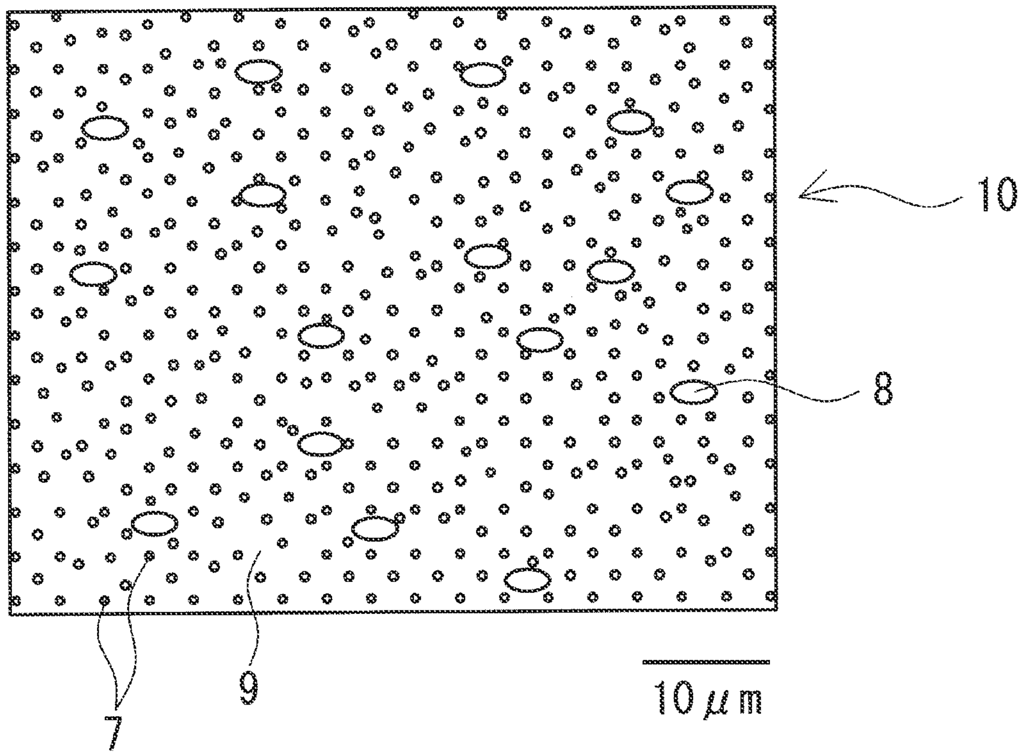
FIG. 2 is a schematic diagram illustrating a structure of an aluminum alloy constituting the aluminum alloy plate of an embodiment or the terminal of an embodiment.

An aluminum alloy plate 4 of an embodiment shown in FIG. 1A is made of an aluminum alloy based on aluminum. This aluminum alloy has a composition containing silicon and magnesium. Hereinafter, silicon and magnesium are sometimes collectively referred to as elements of the first group. FIG. 1B is a cross-sectional view of aluminum alloy plate 4 cut in a plane parallel to the thickness direction of aluminum alloy plate 4, partially showing a surface 40 of aluminum alloy plate 4 and a region nearby. As shown in FIG. 2, an aluminum alloy constituting a surface layer region 10 of aluminum alloy plate 4 has a structure containing compound 8 to some extent.

However, the amount of compound 8 having an equivalent circle diameter of 1.5 μm or more is small in surface layer region 10 of aluminum alloy plate 4. In addition, surface layer region 10 of aluminum alloy plate 4 contains substantially no compound 8 having an equivalent circle diameter of 5 μm or more. Thus, when aluminum alloy plate 4 is subjected to bending working, compound 8 contained in surface layer region 10 of aluminum alloy plate 4 is difficult to become a starting point of cracking and wrinkles.

Hereinafter, the composition, structure, and properties of aluminum alloy plate 4 are described in order.

(Composition)

The aluminum alloy constituting aluminum alloy plate 4 of an embodiment contains each of the elements of the first group to the extent described below, and each of the elements of the second group below at 0 mass % or more and 1.50 mass % or less, with the balance being aluminum and inevitable impurities. That is, the aluminum alloy may contain the elements of the first group but not the elements of the second group, or may contain both the elements of the first group and the elements of the second group. The elements of the second group are one or more elements selected from the group consisting of iron, copper, manganese, chromium, zinc, zirconium, and titanium. Here, elements other than aluminum, the elements of the first group, and the elements of the second group are inevitable impurities.

Aluminum alloys containing silicon and magnesium as additive elements are excellent in strength among other aluminum alloys. Thus, aluminum alloy plate 4 made of the aluminum alloy containing the elements of the first group is excellent in strength. The aluminum alloy containing the elements of the second group in addition to the elements of the first group is excellent in strength and also excellent in conductivity compared to when it does not contain the elements of the second group. This is because compound 8, and compound 7 later below are more likely to be formed in the aluminum alloy containing the elements of the second group in addition to the elements of the first group than in the aluminum alloy containing no elements of the second group. Thus, aluminum alloy plate 4 made of the aluminum alloy containing the elements of the first group and the elements of the second group is excellent in strength and also excellent in conductivity. Specific examples of the aluminum alloy containing the elements of the first group and the elements of the second group is an alloy defined by international alloy designation 6056. Hereinafter, those elements may be indicated by elemental symbols, such as silicon by Si, magnesium by Mg, aluminum by Al, copper by Cu, manganese by Mn, chromium by Cr, zinc by Zn, zirconium by Zr, and titanium by Ti.

<Content Ratio>

<<Elements of First Group>>

The content of Si in the aluminum alloy is 0.01 mass % or more and 1.50 mass % or less. The content of Mg in the aluminum alloy is 0.01 mass % or more and 2.00 mass % or less. Si and Mg strengthen the aluminum alloy by solid-solution strengthening and also strengthen the aluminum alloy by precipitation hardening or aging hardening. When the content of Si and the content of Mg are 0.01 mass % or more, aluminum alloy plate 4 is excellent in strength by solid-solution strengthening and precipitation hardening or aging hardening. When the content of Si is 1.50 mass % or less and the content of Mg is 2.00 mass % or less, the aluminum alloy is suppressed from being excessive-high strength. A reduction in bending workability due to excessive-high strength is thus suppressed. As a result, aluminum alloy plate 4 is excellent in bending workability. The content of Si may be 0.10 mass % or more and 1.48 mass % or less, or 0.30 mass % or more and 1.45 mass % or less. The content of Mg may be 0.20 mass % or more and 1.60 mass % or less, or 0.30 mass % or more and 1.50 mass % or less.

<<Elements of Second Group>>

The content of each element selected from the second group in the aluminum alloy is 0 mass % or more and 1.50 mass % or less. The content of each element selected from the second group may be 0.01 mass % or more and 1.50 mass % or less. When the content of Fe is about 0.01 mass % or more and 0.5 mass % or less, Fe in the aluminum alloy is generally Fe contained in the aluminum bare metal as an impurity. When the raw material of aluminum alloy plate 4 is a low-purity aluminum bare metal, the cost of the raw material may be reduced. In addition, when the content of Fe is 0.50 mass % or less, there is no need to actively add Fe. This also reduces the cost of the raw material. When the contents of Cu, Mn, Cr, Zn, Zr, and Ti each are 0.01 mass % or more, the strength of the aluminum alloy is improved. When the contents of Cu, Mn, Cr, Zn, Zr, and Ti each are 1.50 mass % or less, the aluminum alloy is suppressed from being excessive-high strength. A reduction in bending workability due to excessive-high strength is thus suppressed. As a result, aluminum alloy plate 4 is excellent in bending workability. In addition, when the content of each of the elements of the second group is 1.50 mass % or less, the intermediate material is excellent in workability and moldability during the manufacturing of a terminal 1 formed from aluminum alloy plate 4. In this regard, terminal 1 can be manufactured with high dimensional accuracy and high shape accuracy. Specific examples of the contents of each of the elements of the second group are shown below.

The content of Fe may be 0.05 mass % or more and 0.60 mass % or less, or 0.08 mass % or more and 0.50 mass % or less.

The content of Cu may be 0.20 mass % or more and 1.48 mass % or less, or 0.30 mass % or more and 1.45 mass % or less.

The content of Mn may be 0.20 mass % or more and 1.48 mass % or less, or 0.30 mass % or more and 1.45 mass % or less.

The content of Cr may be 0.03 mass % or more and 0.30 mass % or less, or 0.05 mass % or more and 0.20 mass % or less.

The content of Zn may be 0.05 mass % or more and 0.50 mass % or less, or 0.08 mass % or more and 0.40 mass % or less.

The content of Zr may be 0.05 mass % or more and 0.40 mass % or less, or 0.08 mass % or more and 0.20 mass % or less.

The content of Ti may be 0.01 mass % or more and 0.20 mass % or less, or 0.01 mass % or more and 0.10 mass % or less.

The contents of each element of the first group and the content of each element of the second group defined by international alloy designation 6056 are as follows.

The content of Si is 0.7 mass % or more and 1.3 mass % or less.

The content of Mg is 0.6 mass % or more and 1.2 mass % or less.

The content of Fe is 0.50 mass % or less.

The content of Cu is 0.50 mass % or more and 1.1 mass % or less.

The content of Mn is 0.40 mass % or more and 1.0 mass % or less.

The content of Cr is 0.25 mass % or less.

The content of Zn is 0.10 mass % or more and 0.7 mass % or less.

The content of Ti and Zr is 0.20 mass % or less in total.

<<Others>>

The contents of the elements of the first group and the contents of the elements of the second group are the mass ratios when the aluminum alloy constituting aluminum alloy plate 4 is set to 100 mass %. The mass ratio of each element is determined from the mass of the element contained in the aluminum alloy. In the manufacturing process, the raw material aluminum bare metal may contain the elements of the first group and the elements of the second group as impurities. When such raw material is used, the addition amounts of the elements of the first group and the elements of the second group to the raw material are adjusted so that the content of each element in the aluminum alloy satisfies the above-mentioned range. Thus, the amounts of elements of the first group and elements of the second group contained in the aluminum alloy constituting aluminum alloy plate 4 may include the amount of each element in the raw material.

(Structure)

The aluminum alloy constituting aluminum alloy plate 4 of an embodiment has a structure in which a plurality of compounds 7 and 8 are dispersed in a mother phase 9 in surface layer region 10 of aluminum alloy plate 4. Mother phase 9 is mainly composed of Al. Compound 7 and Compound 8 contain elements contained in the aluminum alloy described above. Compound 7 here is a compound having an equivalent circle diameter of less than 0.5 μm among the compounds contained in the aluminum alloy. Compound 8 is a compound having an equivalent circle diameter of 0.5 μm or more among the compounds contained in the aluminum alloy.

<Mother Phase>

Mother phase 9 is a main phase excluding compound 7 and compound 8. The greater the content of Al and the smaller the solid solution ratios of the elements of the first group and the elements of the second group in mother phase 9, the better the conductivity of aluminum alloy. This is because, when the solid solution ratios of elements of the first group and elements of the second group are small, the elements of the first group and the elements of the second group are present mainly as compound 7 and compound 8 in mother phase 9. For example, when a high-purity aluminum bare metal having a purity of 99.99% or more is used as a raw material of aluminum alloy plate 4, the content of Al in mother phase 9 may be high. It should be noted that some of the elements of the first group and some of the elements of the second group may be present as solid solution in Al.

<Compound>

Compound 7 is typically a binary compound of Si and Mg. Compound 7 may be a compound containing Al as described below. Compound 7 is mainly a precipitate, a Guinier-Preston zone (GP zone), or a cluster. Compound 7, which is smaller than compound 8, mainly contributes to improve the strength of the aluminum alloy described above. Due to the effect of improving the strength of compound 7 by precipitation hardening or aging hardening, aluminum alloy plate 4 is excellent in strength.

Compound 8 is typically a compound containing Al. The compound containing Al here contains one or more elements selected from the group consisting of Si, Mg, Fe, Cu, Mn, Cr, Zn, Zr, and Ti, and Al. The compound containing Al here is, for example, an intermetallic compound containing one or more metal elements selected from the group consisting of Mg and the elements of the second group, and Al. Specific examples of the intermetallic compound are a compound of Al and Mg, a compound of Al and Fe, a compound of Al and Fe and Mn, a compound of Al and Mg and Cu, and a compound of Al and Cu. Compounds containing Al may further contain Si in addition to the metal elements described above and Al. Specific examples of such compounds include a compound of Al and Fe and Mn and Si. Compound 8 is mainly a crystallite.

The region in aluminum alloy plate 4 from surface 40 of aluminum alloy plate 4 to 200 μm toward the interior of aluminum alloy plate 4 is called surface layer region 10, as shown in FIG. 1B. FIG. 2 illustrates a part of surface layer region 10. FIG. 2 shows the alloy structure conceptually and schematically, and the size, shape, and number of compounds 7 and 8 are different from the actual structure. In the cross-section of surface layer region 10 of aluminum alloy plate 4 of an embodiment, the aluminum alloy satisfies the following three conditions (a) to (c). In addition to the three conditions (a) to (c), the aluminum alloy may satisfy condition (d).

(a) The number of fields of view containing compound 8 having an equivalent circle diameter of 5 μm or more out of 10 fields of view extracted from the cross-section is 3 or less.

(b) The number density of compound 8 having an equivalent circle diameter of 1.5 μm or more and less than 5.0 μm is 0.0010 per $\mu m^2$ or less.

(c) The area ratio of compound 8 having an equivalent circle diameter of 0.5 μm or more is 0.1% or more and less than 1.0%.

(d) The average aspect ratio of compound 8 having an equivalent circle diameter of 1.0 μm or more and less than 1.5 μm is 2.5 or less.

The cross-section here is a cross-section in which aluminum alloy plate 4 is cut perpendicular to surface 40 of aluminum alloy plate 4 at any position of aluminum alloy plate 4. A representative example of the cross-section is a cross-section cut in a plane parallel to the thickness direction of aluminum alloy plate 4. Surface layer region 10 is extracted from the cross-section. In addition, observation fields of view having a predetermined size are arbitrarily taken from surface layer region 10.

The equivalent circle diameter of a compound is a diameter of a circle having a cross-sectional area equal to the cross-sectional area of the compound in the above-described cross-section.

The number density of a compound is the number of "compounds having an equivalent circle diameter of 1.5 μm or more and less than 5.0 μm" present per unit area of the surface layer region in the above cross-section.

The area ratio of a compound is a proportion of the sum of the area of the compound having an equivalent circle diameter of 0.5 μm or more in the cross-section. Since the observation field of view is arbitrarily taken as described above, the area ratio of this compound corresponds to the area ratio of a randomly distributed compound. Generally, the area ratio of randomly distributed particles is correlated with the volume ratio of the particles. Thus, in the above cross-section, the area ratio of the compound in the surface layer region can be regarded as the volume ratio of the compound in the surface layer region.

The average aspect ratio of a compound is a value obtained by dividing the Feret's diameter of the "compound having an equivalent circle diameter of 1.0 μm or more and less than 1.5 μm" by the minimum Feret's diameter in the cross-section. The Feret's diameter is the maximum distance of a straight line connecting any two points on the contour line of the compound in the cross-section. The minimum Feret's diameter is the minimum distance between the two parallel tangents that sandwich the contour line of the compound in the cross-section.

<a Upper Limit of Compound Size>

Compound 8 having an equivalent circle diameter of 5 μm or more is coarse compared to compound 8 having an equivalent circle diameter of less than 5 μm. Stress is easily concentrated on coarse compound 8. Also, when coarse compound 8 is crushed due to the concentration of stress on coarse compound 8, voids may occur within the aluminum alloy. Furthermore, the junction interface between coarse compound 8 and mother phase 9 may be separated by the stress concentration described above. Any of the coarse compound 8 itself, the voids, and the separation part of the junction interface described above easily becomes a starting point of cracking and wrinkles and develops fissures. Thus, when aluminum alloy plates containing coarse compound 8 in surface layer region 10 are subjected to bending working, cracking easily occurs. Aluminum alloy plate 4 satisfying condition (a) contains substantially no coarse compound 8 having an equivalent circle diameter of 5 μm or more in surface layer region 10. Aluminum alloy plate 4 as such is thus preferable because it is difficult to have cracks when subjected to bending working and thus is excellent in bending workability. From the viewpoint of good bending workability, it is preferred that the number of fields of view containing compounds having an equivalent circle diameter of 5 μm or more may be 2 or less, 1 or less, or zero.

<b Number Density of Compound>

Compound 8 having an equivalent circle diameter of 1.5 μm or more and less than 5.0 μm is somewhat larger, although it is smaller than compound 8 having an equivalent circle diameter of 5 μm or more. When the number density of somewhat larger compound 8 is 0.0010 per $\mu m^2$ or less, the occurrence of cracking or development of fissures caused by such compound 8 is reduced. Aluminum alloy plate 4 as such is difficult to have cracks when subjected to bending working. From this point, it is also said that aluminum alloy plate 4 is excellent in bending workability. The smaller the number density, the better the bending workability of aluminum alloy plate 4. From the viewpoint of good bending workability, the number density may be 0.0009 per $\mu m^2$ or less, 0.0008 per $\mu m^2$ or less, 0.0005 per $\mu m^2$ or less, or 0.0003 per $\mu m^2$ or less.

<c Area Ratio of Compound>

Compound 8 having an equivalent circle diameter of 0.5 μm or more includes coarse compound 8 and somewhat larger compound 8 described above. When the area ratio of compound 8 having an equivalent circle diameter of 0.5 μm or more is less than 1.0%, the occurrence of cracking or development of fissures caused by such compound 8 is reduced. From this point, it is also said that aluminum alloy plate 4 is excellent in bending workability. When the area ratio is 0.1% or more, the aluminum alloy constituting aluminum alloy plate 4 contains the elements of the first group and the elements of the second group to the extent that compound 8 is formed. In other words, the strength of the aluminum alloy is improved by containing the elements of the first group and the elements of the second group. Aluminum alloy plate 4 as such is excellent in strength. From the viewpoint of good bending workability and improvement of strength, the area ratio may be 0.12% or more and 0.90% or less, or 0.15% or more and 0.80% or less.

<d Average Aspect Ratio of Compound>

The occurrence of cracking and development of fissures caused by compound 8 may also be reduced by the shape of compound 8. Compound 8 having an equivalent circle diameter of 1.0 μm or more and less than 1.5 μm is somewhat larger. The shape of compound 8 having an average aspect ratio of 2.5 or less is elliptical, and even close to a true circle. Thus, although compound 8 satisfies condition (d) is somewhat larger, it is difficult to become a starting point of cracking and wrinkles, and difficult to cause the development of fissures. Aluminum alloy plate 4 as such is excellent in bending workability. Furthermore, compound 8 that satisfies condition (d) has the effects of easily becoming a nucleus of recrystallization or suppressing grain boundary migration in recrystallization. As a result, the recrystallized grains tend to become finer. The finer the recrystallized grains is, the more strength the aluminum alloy has. Thus, aluminum alloy plate 4 is also excellent in strength. From the viewpoint of good bending workability and improvement of strength, the average aspect ratio may be 2.3 or less, 2.0 or less, or 1.8 or less. The lower limit of the average aspect ratio is 1. The average aspect ratio may be 1 or more and 2.5 or less, 1 or more and 2.3 or less, or 1 or more and 2.0 or less.

(Properties)

<Vickers Hardness>

The Vickers hardness of aluminum alloy plate 4 of an embodiment is, for example, 70 HV or more. When the Vickers hardness is 70 HV or more, aluminum alloy plate 4 is excellent in strength. The higher the Vickers hardness, the more excellent the strength of aluminum alloy plate 4. From the viewpoint of improving strength, the Vickers hardness may be 72 HV or more, 80 HV or more, or 100 HV or more.

There is no upper limit for Vickers hardness. The larger the content of the elements of the first group and the elements of the second group, the higher the Vickers hardness tends to be. However, as the content of the elements of the first group and the elements of the second group is higher, the number density, the area ratio, and the aspect ratio described above may become greater. As a result, the bending workability tends to be lower. From the viewpoint of ensuring bending workability, the Vickers hardness may be, for example, 160 HV or less. Furthermore, the Vickers hardness may be 140 HV or less.

When the Vickers hardness is 72 HV or more and 160 HV or less, aluminum alloy plate 4 is excellent in strength and also excellent in bending workability. From the viewpoint of improving strength and ensuring bending workability, the Vickers hardness may be 72 HV or more and 140 HV or less, 80 HV or more and 135 HV or less, or 90 HV or more and 130 HV or less.

<Conductivity>

The conductivity of aluminum alloy plate 4 of an embodiment is, for example, 40% IACS or more and less than 63% IACS. When the conductivity is 40% IACS or more, aluminum alloy plate 4 is excellent in conductivity. The conductivity of aluminum alloy plate 4 may be higher when, for example, a high-purity aluminum bare metal as described above is used as a raw material. Aluminum alloy plate 4 having a conductivity of less than 63% IACS is excellent in manufacturability in that it does not require high-precision removal of impurities in the manufacturing process. This is because aluminum alloy plate 4 can be manufactured by using a relatively low-purity aluminum bare metal as the raw material. When a low-purity aluminum bare metal is used as the raw material, the time for removing impurities may be short, or the removal of impurities may be unnecessary. From the viewpoint of good conductivity and manufacturability, although it also depends on the composition, the conductivity may be 41% IACS or more and 58% IACS or less. The conductivity may be 42% IACS or more and 55% IACS or less, 43% IACS or more and 53% IACS or less, or 43% IACS or more and 50% IACS or less.

When the aluminum alloy constituting aluminum alloy plate 4 is an alloy defined by international alloy designation 6056, the Vickers hardness may be 72 HV or more and the conductivity may be 40% IACS or more and 53% IACS or less.

(Shape, Size)

The shape and size of aluminum alloy plate 4 are not particularly limited. FIG. 1A shows aluminum alloy plate 4 having the planar shape of a rectangle, but the planar shape may be a circle, a polygon, or other shapes. The thickness of aluminum alloy plate 4 is, for example, 0.1 mm or more and 5 mm or less. The length and width of aluminum alloy plate 4 are also not particularly limited. Aluminum alloy plate 4 may be a long aluminum alloy plate such as a coiled material.

Main Effects of Embodiments

Aluminum alloy plate 4 of an embodiment is excellent in strength and also excellent in bending workability by being made of the aluminum alloy having the specific composition and the specific structure as described above. Preferably, aluminum alloy plate 4 of an embodiment is also excellent in conductivity. These effects are specifically described in Test Example 1 below. Aluminum alloy plate 4 as such is suitable for materials of members subjected to bending working and for which high strength is desired, such as a terminal, a bus bar, a housing, and other structural members.

[Terminal]

(Overview)

Figure 3:
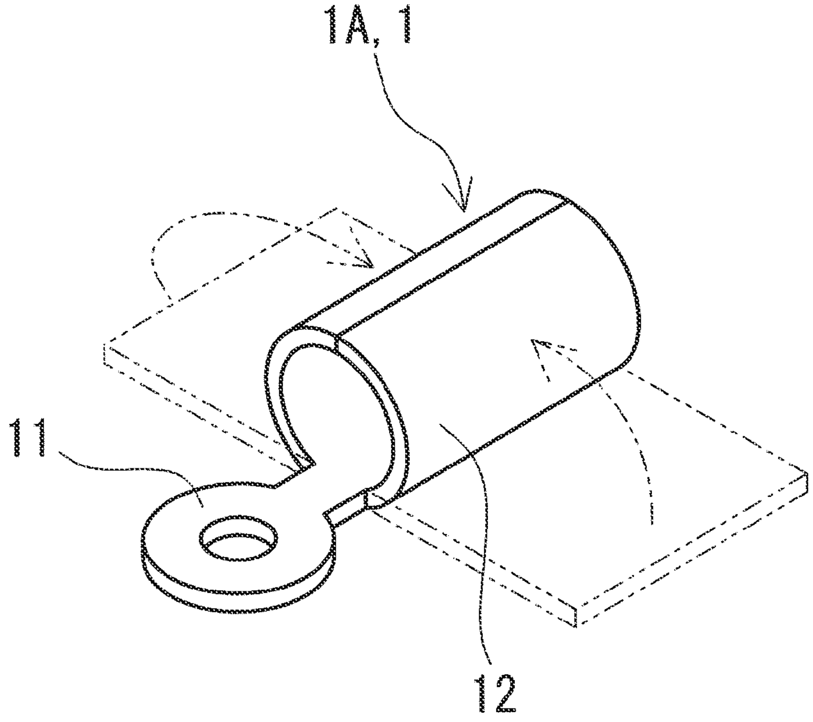
FIG. 3 is a perspective view illustrating one example of the terminal of embodiment 1.
Figure 4:
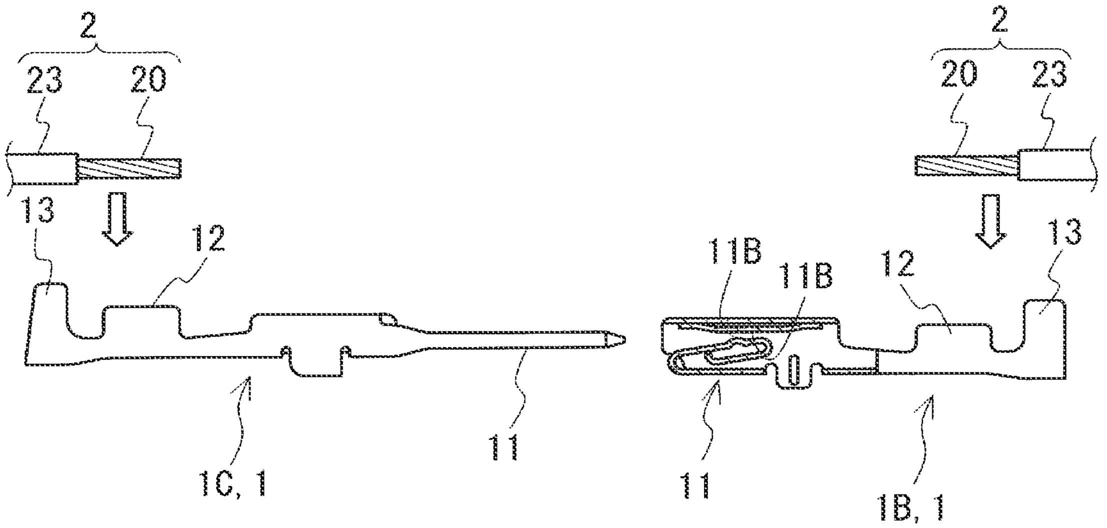
FIG. 4 is a side view illustrating one example of the terminal of embodiment 2 and one example of the terminal of embodiment 3.
Figure 5:
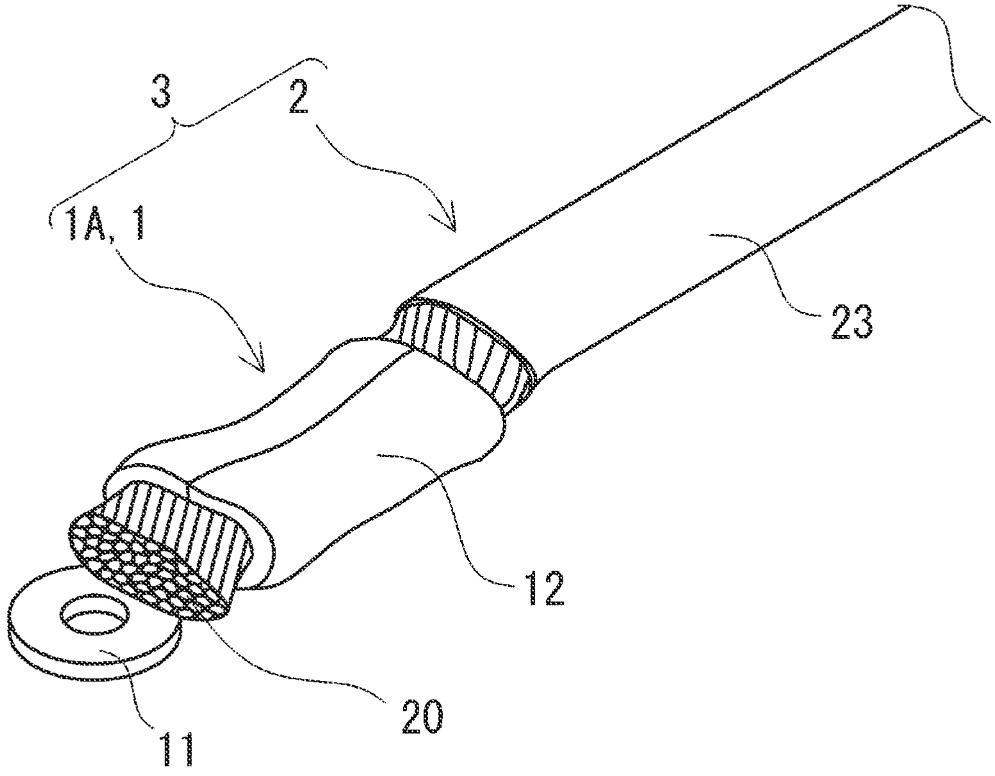
FIG. 5 is a perspective view illustrating the electric wire with terminal including one example of the terminal of embodiment 1.
Figure 6:
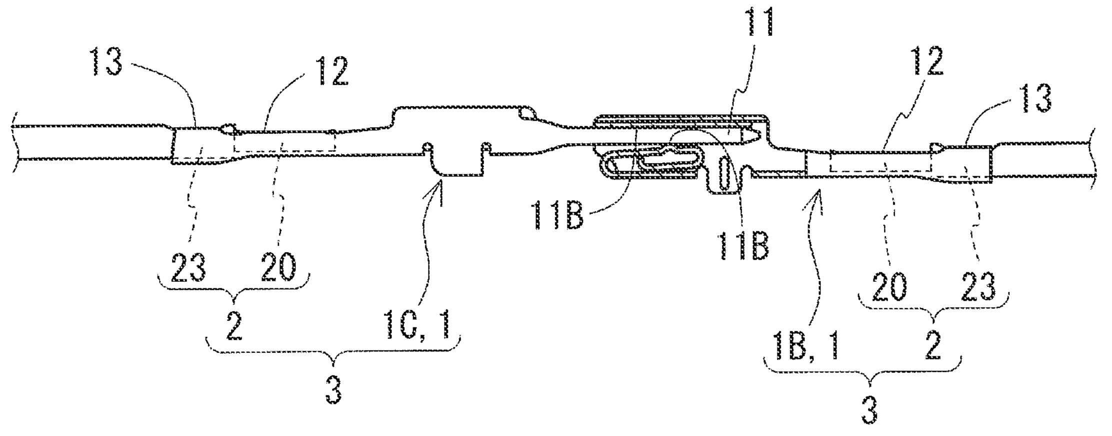
FIG. 6 is a side view illustrating the electric wire with terminal including one example of the terminal of embodiment 2 and an electric wire with terminal including one example of the terminal of embodiment 3.

Terminal 1 is a metal fitting that connects an electric wire 2 with a predetermined object. Terminal 1 is used in a state in which terminal 1 is attached to the end of electric wire 2 as shown in FIGS. 5 and 6. Terminal 1 includes a connection portion 11 that connects with the object and a connection portion 12 that connects with a conductor 20 of electric wire 2, as shown in FIGS. 3 and 4. FIGS. 3 and 4 illustrate a wire barrel portion that grips conductor 20 as connection portion 12 that connects with conductor 20. Terminal 1 of an embodiment is formed from aluminum alloy plate 4 of an embodiment. Terminal 1 is manufactured by bending aluminum alloy plate 4 cut into a predetermined shape so that aluminum alloy plate 4 has a predetermined three-dimensional shape.

Terminal 1 formed from aluminum alloy plate 4 substantially maintains the composition and structure of the aluminum alloy constituting aluminum alloy plate 4, properties such as Vickers hardness and conductivity, and thickness. The above descriptions for aluminum alloy plate 4 generally correspond to the descriptions of "terminal 1" by replacing "aluminum alloy plate 4" with "terminal 1". Thus, although specific examples and use examples of terminal 1 are described below, other detailed descriptions are omitted. Note that when terminal 1 is, for example, a crimp terminal 1A or a male terminal 1C described later, the cross-section of terminal 1 is perpendicular to the surface of connection portion 11 for connection portion 11. When terminal 1 is, for example, a female terminal 1B described later, the cross-section of terminal 1 is perpendicular to the surface of a spring portion 11B used for the contact point. The perpendicular cross-section corresponds to a cross-section cut in a plane parallel to the thickness direction of aluminum alloy plate 4 constituting connecting portion 11 or spring portion 11B.

(Specific Examples of Terminal)

Terminal 1 of embodiment 1 is crimp terminal 1A. Crimp terminal 1A includes a flat plate-shaped connection portion 11 and a cylindrical-shaped connection portion 12 as shown in FIG. 3. Connection portion 11 has a hole that penetrates the front and back of the plate. Through the hole, a bolt, not shown in the figure, is inserted. Crimp terminal 1A is connected to an object with the bolt. Crimp terminal 1A is composed of aluminum alloy plate 4 punched out to a predetermined shape. Aluminum alloy plate 4 of the predetermined shape has two rectangular pieces virtually indicated by a two-dot chain line. The two rectangular pieces are cylindrically shaped by bending so that their edges are in contact. The edges in contact are joined by welding or the like to form a cylindrical-shaped connection portion 12. Connection portion 12 is crimped to conductor 20 by pressing connection portion 12 in a state that conductor 20 of electric wire 2 is inserted inside of this connection portion 12. By this crimping, crimp terminal 1A is connected to the end of electric wire 2 as shown in FIG. 5. Connection portion 11 shown in FIG. 3 has a single hole, but may have a plurality of holes. It is desirable that connection portion 11 of crimp terminal 1A has a strength that can withstand the deformation accompanying the fastening so that the bolt does not loosen when the bolt is fastened. It is desirable for connection portion 12, which is a wire barrel portion, to have bending workability such that cracking and wrinkles do not occur during bending as described above or crimping.

Terminal 1 of embodiment 2 is female terminal 1B. Female terminal 1B includes connection portion 11, connection portion 12 and an insulation barrel portion 13 as shown in FIG. 4. Connection portion 11 has a square cylindrical shape and includes two spring portions 11B inside the square cylinder. In FIG. 4, connection portion 11 shows a cross-section cut in a plane parallel to the longitudinal direction of the square cylinder. The two spring portions 11B arranged opposite to each other sandwich connection portion 11 of male terminal 1C described later. By the biasing force of each spring portion 11B, both spring portions 11B contact with connection portion 11 of male terminal 1C with a predetermined pressure. By maintaining the contact state with male terminal 1C by the biasing force, female terminal 1B is connected to male terminal 1C, which is an object, as shown in FIG. 6. Female terminal 1B is formed by bending aluminum alloy plate 4 punched out to a predetermined shape to a predetermined shape. Spring portion 11B is also provided by bending aluminum alloy plate 4 or forming aluminum alloy plate 4 into a convex shape. Connection portion 12 includes two rectangular pieces. The two rectangular pieces are folded to wrap conductor 20 of electric wire 2. Insulation barrel portion 13 also includes two rectangular pieces. The two rectangular pieces are folded to wrap an insulating layer 23 of electric wire 2. As shown in FIG. 6, connection portion 12 and insulation barrel portion 13 are folded so that female terminal 1B is connected to the end of electric wire 2. It should be noted that female terminal 1B may include a single spring portion 11B. In this case, spring portion 11B presses connection portion 11 of male terminal 1C inserted into a square cylinder against the inner surface of the square cylinder. It is desirable for spring portion 11B of female terminal 1B to have a strength that can express a biasing force to maintain a state in contact with male terminal 1C. When the strength is insufficient, the biasing force is reduced. When the biasing force is small, the contact state between female terminal 1B and male terminal 1C becomes insufficient. As a result, the contact resistance between female terminal 1B and male terminal 1C increases. It is desirable for connection portion 11 of female terminal 1B, connection portion 12, which is a wire barrel portion, and insulation barrel portion 13 to have a bending workability such that no cracking or wrinkles occur when they are bent as described above.

Terminal 1 of embodiment 3 is male terminal 1C. Male terminal 1C includes connection portion 11, connection portion 12, and insulation barrel portion 13 as shown in FIG. 4. Connection portion 11 is rod-shaped. The rod-shaped connection portion 11 is sandwiched by spring portion 11B of female terminal 1B as described above, which makes male terminal 1C connect with female terminal 1B that is an object, as shown in FIG. 6. Male terminal 1C is formed by bending aluminum alloy plate 4 punched out to a predetermined shape into a predetermined shape. The basic configuration of connection portion 12 and insulation barrel portion 13 of male terminal 1C is similar to that of connection portion 12 and insulation barrel portion 13 of female terminal 1B. Thus, detailed descriptions are omitted. It is desirable for connection portion 11 of male terminal 1C to have a strength enough to express a reaction force that can withstand the biasing force from spring portion 11B of female terminal 1B. When the above strength is insufficient, the contact resistance increases as described above. It is desirable for connection portion 11 of male terminal 1C, connection portion 12, which is a wire barrel portion, and insulation barrel portion 13 to have a bending workability such that no cracking or wrinkles occur when they are bent as described above.

Connection portion 12 that connect with conductor 20 may be not the wire barrel portion as described above, but may be joined with conductor 20 by ultrasonic bonding, welding, or the like. It is desirable for insulation barrel portion 13 provided in terminal 1 including such connection portion 12 or connection portion 11 formed by bending as described above to have a bending workability such that no cracking occurs during bending.

Terminal 1 may include a substrate formed from aluminum alloy plate 4, and a plating layer. The plating layer covers at least a part of the surface of the substrate. Examples of the constituent materials of the plating layer include tin, tin alloy, nickel, nickel alloy, silver, and silver alloy. Terminal 1 having the plating layer can further reduce the contact resistance.

(Use Example of Terminal)

An electric wire with terminal 3 of an embodiment includes electric wire 2 and terminal 1 of an embodiment as shown in FIGS. 5 and 6. As shown in FIG. 4, electric wire 2 includes conductor 20 and insulating layer 23. The removal of insulating layer 23 at the end of electric wire 2 exposes the end of conductor 20. Connection portion 12 of terminal 1 is attached to the end of this exposed conductor 20.

Conductor 20 is composed of a single metal wire or a plurality of metal wires. The plurality of metal wires is, for example, twisted wires or a twisted wire assembly. The twisted wire assembly is one in which a plurality of twisted wires are twisted together. Examples of the metal that constitutes the metal wire include pure copper, copper alloy, pure aluminum, and aluminum alloy. Electric wire 2, in which conductor 20 is composed of pure aluminum or an aluminum alloy, is lighter in mass compared to when it is composed of pure copper or a copper alloy. In addition, conductor 20 composed of pure aluminum or an aluminum alloy does not substantially cause heterogeneous metal corrosion with terminal 1 formed from aluminum alloy plate 4. Insulating layer 23 is composed of an electrically insulating material such as a resin.

[Bus Bar]

Figure 7:
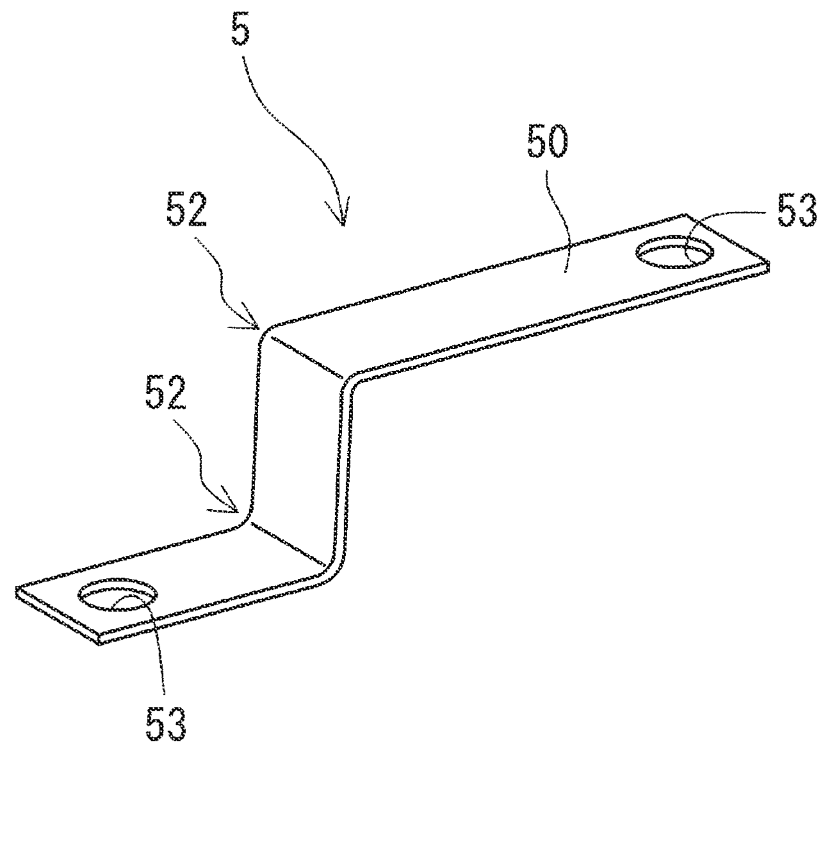
FIG. 7 is a perspective view illustrating one example of the bus bar of an embodiment.

A bus bar 5 is a metal fitting that connects conductors to each other. Bus bar 5 is a plate piece 50 formed from aluminum alloy plate 4 punched out to a predetermined shape. Plate piece 50 has a hole 53 through which a bolt, not shown in the figure, is inserted. Bus bar 5 shown in FIG. 7 is composed of an elongated rectangular plate piece 50. Plate piece 50 is partially bent. Specifically, bus bar 5 includes two bent portions 52 that are bent at approximately right angles and have a stepped shape with two bent portions 52. Bus bar 5 also has one hole 53 at each of the longitudinal ends of plate piece 50. The shape, width, and length of plate piece 50, the number, size, and arrangement position of hole 53, and the like can be changed. The shape and size of bus bar 5 are adjusted according to the shape and size of the space in which bus bar 5 is arranged. By having bent portions 52, bus bar 5 can be arranged even in a narrow space, and a planning structure with high space-utilization efficiency can be constructed. Bus bar 5 is connected to a conductor, not shown in the figure, by a bolt. It is desirable for the peripheral part of hole 53 in bus bar 5 to have a strength that can withstand the deformation accompanying a fastening so that the bolt does not loosen when the bolt is fastened. It is desirable for bending portion 52 to have a bending workability such that no cracking or wrinkles occur when plate piece 50 is bent.

Main Effects of Embodiments

Terminal 1 of an embodiment and terminal 1 included in electric wire with terminal 3 of an embodiment have the following effects by being formed from aluminum alloy plate 4 of an embodiment having excellent strength. In crimp terminal 1A of embodiment 1, connection portion 11 is difficult to deform even when connection portion 11 is fastened with a bolt. As a result, the bolt is hard to loosen.

Thus, the contact resistance between crimp terminal 1A and the bolt-fastened object can be reduced, and the contact state between them can be maintained well for a long time. In female terminal 1B of embodiment 2, spring portion 11B can apply an appropriate biasing force to connection portion 11 of male terminal 1C of embodiment 2. In male terminal 1C of embodiment 3, the rod-shaped connection portion 11 can apply an appropriate reaction force to spring portion 11B of female terminal 1B. As a result, the contact resistance between female terminal 1B and male terminal 1C is small. In addition, the contact state between spring portion 11B of female terminal 1B and connection portion 11 of male terminal 1C can be maintained well for a long time. From these points, terminal 1 of an embodiment can have an improved reliability as an electrical contact point member. Terminal 1 as such is suitable for an electrical contact point member. In addition, terminal 1 of an embodiment and terminal 1 included in electric wire with terminal 3 of an embodiment are difficult to have cracks or wrinkles during bending or crimping to grip conductor 20 of electric wire 2 by being formed from aluminum alloy plate 4 of an embodiment having excellent bending workability. Furthermore, aluminum alloy plate 4 of an embodiment can manufacture terminal 1 having excellent shape accuracy and dimensional accuracy. From this point, terminal 1 of an embodiment is also excellent in manufacturability. Electric wire with terminal 3 of an embodiment includes terminal 1 having excellent bending workability, so that terminal 1 is easily attached to the end of electric wire 2. From this point, electric wire with terminal 3 of an embodiment is also excellent in manufacturability.

Terminal 1 formed from aluminum alloy plate 4 having a conductivity of 40% IACS or more is suitable for an electrical contact point member. When the conductivity is 40% IACS or more, the heat generation amount of terminal 1 when current flows through terminal 1 is small. As a result, the deterioration of electric wire 2 due to heat generation is reduced.

Bus bar 5 of an embodiment has the following effects because it is formed from aluminum alloy plate 4 of an embodiment having excellent strength. Even when a peripheral part of hole 53 in bus bar 5 is fastened with a bolt, the peripheral part of hole 53 is difficult to deform. As a result, the bolt is hard to loosen. Thus, the contact resistance between bus bar 5 and the bolt-fastened conductor can be reduced and the contact state between them can be maintained well for a long time. In addition, bus bar 5 of an embodiment is difficult to have cracks or wrinkles during the bending working to form bent portion 52 during the manufacturing process by being formed from aluminum alloy plate 4 of an embodiment having excellent bending workability. Thus, bus bar 5 having excellent shape accuracy and dimensional accuracy is manufactured. From this point, bus bar 5 of an embodiment is also excellent in manufacturability.

[Method for Manufacturing Aluminum Alloy Plate, Method for Manufacturing Terminal, and Method for Manufacturing Bus Bar]

Aluminum alloy plate 4 of an embodiment can be manufactured, for example, by a manufacturing method including the step of manufacturing a solidified material by rapidly cooling and solidifying a molten metal made of an aluminum alloy having the specific composition described above. Terminal 1 of an embodiment and bus bar 5 of an embodiment can be manufactured, for example, by a manufacturing method including the following first step and second step.

(First Step) preparing aluminum alloy plate 4 having the specific composition described above and the specific structure described above.

(Second Step) cutting aluminum alloy plate 4 described above into a predetermined shape to form aluminum alloy plate 4 of a predetermined shape into a predetermined shape.

The present inventors have found that a method capable of rapidly cooling and solidifying a molten metal is more preferred than a conventional melting method to manufacture aluminum alloy plate 4 having the specific composition described above and the specific structure described above. The solidified material obtained by rapidly cooling and solidifying a molten metal contains only a small amount of or preferably almost no compound 8 of a size more than 1.5 μm. Aluminum alloy plate 4, and even terminal 1, finally manufactured by using the solidified material described above contains only a small amount of compound 8 having an equivalent circle diameter of 1.5 μm or more and contains substantially no compound 8 having an equivalent circle diameter of 5 μm or more in surface layer region 10. Hereinafter, each step is described.

<First Manufacturing Method: Cases of Manufacturing Solidified Material Composed of Thin-Strip or Powder>

<<Solidification Step>>

A solidified material is manufactured by rapidly cooling and solidifying a molten metal of aluminum alloy having the specific composition described above. The solidified material is, for example, a thin-strip, a flake, or a powder. A thin-strip or powder solidified material can be manufactured by using the liquid rapidly cooling and solidifying method, the atomization method, or the like. Examples of the liquid rapidly cooling and solidifying method include a melt span method. Examples of the atomization method include a gas atomization method and a water atomization method. In the liquid rapidly cooling and solidifying method and the atomization method, the cooling rate of the molten metal is, for example, $1\times10^{4}$° C./sec or more, which is more than the cooling rate of the conventional melting method. The basic procedures of the melt span method and the basic procedures of the atomization method can refer to publicly known methods.

The melt span method is a method for manufacturing a thin-strip by spraying a molten metal on a high-speed rotating cooling medium and rapidly cooling the molten metal. The cooling medium is a roll, a disc, or the like. The constituent material of the cooling medium is a metal such as copper. The manufactured thin-strip is easy to use when finely crushed to a flaky or powdery material.

The atomization method is a method for manufacturing a powder by spraying a gas or water having high cooling ability with high pressure to a fine flow of a molten metal flowing from a small hole at the bottom of a crucible. The high-pressure gas or water disperses the flow of the molten metal and rapidly cools the molten metal. The species of gas are argon, air, nitrogen, and the like. In the atomization method, the cooling rate may be increased by adjusting the manufacturing conditions so that the average particle size of the powder to be manufactured is smaller. The average particle size of the atomized powder is, for example, 1 μm or more and 150 μm or less. The average particle size of the atomized powder may be 100 μm or less, or further 80 μm or less.

<<Extrusion Process>>

Next, the flaky or powdery solidified material described above is subjected to plastic working to manufacture a plastic worked material. Plastic working integrates and densifies the flaky or powdery solidified material. For example, a plastic worked material having a relative density of 90% or more is manufactured. Such dense plastic worked material can be manufactured, for example, by performing extrusion working at a temperature range of 300° C. or more and less than 520° C. This extrusion working is a so-called powder extrusion. By heating the material to the above temperature range, the plasticity of the solidified material can be increased. The higher the temperature, the more improved the plasticity of the solidified material. When the extrusion working is carried out at 300° C. or more, a long plate-like extruded material can be manufactured. Note that extrusion working at 300° C. or more here corresponds to hot working. When a plate-like extruded material is manufactured by this extrusion working, the extruded material has a specific structure satisfying conditions (a) to (c), and even condition (d) described above in the cross-section of the surface layer region. The manufactured extruded material can be taken as aluminum alloy plate 4.

<<Previous Process>>

Before the above-described extrusion process, plastic working can be performed at a temperature at which the compound is not precipitated. The temperature at which the compound is not precipitated is, for example, less than 200° C. Note that plastic working at less than 200° C. here corresponds to cold working. When the working temperature of cold working is at ambient temperature, temperature control is not required. The ambient temperature is 5° C. or more and 35° C. or less. Cold working is used to manufacture, for example, an intermediate worked material having a relative density of 80% or more. By applying the above-described extrusion working to this intermediate worked material, the extruded material tends to be denser compared to when cold working is not performed before extrusion working. The cold working here is, for example, a press molding. Examples of the press molding include a hydrostatic press, and a uniaxial press using a uniaxial press device. It should be noted that cold working as a previous process is not necessarily required.

<<Post-Process>>

After the above-described extrusion process, cold working can be performed on the extruded material. Alternatively, the extruded material can be subjected to heat treatment after the above-described extrusion process. Alternatively, the extruded material can be subjected to both cold working and heat treatment. The conditions of the post-process are adjusted such that, in the cross-section of the surface layer region of the cold-worked or heat-treated material subjected to the post-process, the specific structure satisfying conditions (a) to (c) and even condition (d) described above is obtained. The Vickers hardness can be adjusted by such a cold working or heat treatment as a post-process as such. For example, by subjecting the extruded material to cold working, the obtained cold-worked material is worked and hardened. As a result, the Vickers hardness is increased. For example, by heat-treating the extruded material, the size of compound 8 and the number density described above can be adjusted. As a result, the Vickers hardness is adjusted. When a post-process is performed, the cold-worked material or heat-treated material subjected to the post-process can be taken as aluminum alloy plate 4. It should be noted that cold working or heat treatment as a post-process is not necessarily required.

When the cold working as a post-process is plastic working at ambient temperature, the strain introduced into the cold-worked material tends to be large. As a result, the Vickers hardness is increased. Thus, aluminum alloy plate 4 composed of the above cold-worked material is excellent in strength. The cold working here is, for example, cold rolling or cold drawing. The cold working here is performed so that the equivalent plastic strain is, for example, 0.01 or more.

As the heat treatment, at least one of the following first heat treatment and second heat treatment is performed. Only the first heat treatment may be performed, only the second heat treatment may be performed, or the second heat treatment may be performed after the first heat treatment. The first heat treatment was performed by holding an object such as an extruded material in a heated state at a temperature of 430° C. or more and 600° C. or less for 1 hour or more to 24 hours or less, and then hardening the object in water or oil. Alternatively, forced air cooling is performed instead of the above hardening. The first heat treatment corresponds to a solution treatment. The second heat treatment was performed by holding an object such as an extruded material in a heated state at a temperature of 150° C. or more and 250° C. or less for 1 hour or more to 24 hours or less, and then the furnace-cooling or air-cooling the object. The second heat treatment corresponds to an aging treatment.

By the first heat treatment, the elements of the first group and the elements of the second group may be dissolved in aluminum. Then, by holding them at ambient temperature, a structure in which fine compound 7 composed of precipitates are uniformly dispersed can be formed. The precipitates precipitate by the second heat treatment. The precipitates may be fine and have a uniform size. Thus, the second heat-treated material may have a structure in which fine compound 7 is uniformly dispersed. Since the obtained material has such a structure, aluminum alloy plate 4 composed of the first heat-treated material or the second heat-treated material is excellent in strength. This aluminum alloy plate 4 is also excellent in conductivity because compound 7 is precipitated. In addition, by the heat treatment, working strains associated with plastic working are removed to some extent. From this point, aluminum alloy plate 4 composed of the heat-treated material subjected to the heat treatment is also excellent in bending workability.

The above-described heat treatment can be performed continuously from the above-described extrusion process. For example, extrusion working is performed at about 500° C., then water cooling is performed by shower.

<Second Manufacturing Method: Case of Manufacturing Solidified Material Composed of Plate>

<<Solidification Step>>

The solidified material described above may be a plate. The solidified material composed of a plate can be manufactured, for example, by using methods called such as strip caster, continuous casting of thin plates, continuous casting rolling, and the like. One example of the strip caster method is the so-called double-roll casting method. The double-roll casting method is a method for manufacturing a casted plate by solidifying a molten metal while rolling the molten metal by a pair of metal rolls. The cooling rate of the molten metal at the time of rapid cooling can be controlled by the feed rate of the casted plate, that is, the casting rate. The cooling rate is preferably 80° C./sec or more. The cooling rate may be 85° C./sec or more, or 90° C./sec or more. When the cooling rate is 80° C./sec or more, the obtained casted plate has a specific structure satisfying conditions (a) to (c), and even condition (d) described above in the cross-section of the surface layer region. Thus, the manufactured casted plate can be taken as aluminum alloy plate 4. When the cooling rate is less than 80° C./sec, compound 8 tends to be coarse or have a larger average aspect ratio.

<<Post-Process>>

The above-described post-process can be further performed on the casted plate. Examples of cold working as a post-process include cold rolling. Cold rolling and a heat treatment described above may be performed in order on the casted plate. Alternatively, a heat treatment as a post-process may be performed continuously on the casted plate.

<Method for Manufacturing Terminal, and Method for Manufacturing Bus Bar>

(First Step)

In the first step, it is desirable to prepare aluminum alloy plate 4 manufactured by the first method or the second method described above.

(Second Step)

Aluminum alloy plate 4 manufactured continuously by the above-described extrusion working or double-roll casting is a long plate. In the second step, a plate material cut into a predetermined shape is manufactured from this aluminum alloy plate 4. The plate material of the predetermined shape has a shape where terminal 1 before being bent or bus bar 5 before being bent is developed. By bending this plate material into a cylindrical shape at a predetermined site, a cylindrical connection portion 12 shown in FIG. 3 is formed. A square cylindrical connection portion 11 and a rod-shaped connection portion 11 shown in FIG. 4 are formed by bending this plate material at a predetermined site. In addition, connection portion 12 and insulation barrel portion 13, which are the wire barrel portions shown in FIGS. 3 and 4, are formed. Bus bar 5 shown in FIG. 7 is formed by bending the plate material at a predetermined site.

Test Example 1

A plate material made of an aluminum alloy having the composition shown in Table 1 was manufactured by the manufacturing method shown in Table 2. The structure of the surface layer region and the properties of the manufactured aluminum alloy plate are shown in Table 3.

(Manufacturing of Samples)

The main raw material of each sample is commercially available aluminum bare metal. The purity of aluminum bare metal used in samples No. 103 and No. 109 is 99.99%, which is higher than the purity of aluminum bare metal in other samples. The purity of the aluminum bare metal of the other samples is 99.7%. The addition amounts of the elements of the first group and the elements of the second group are adjusted according to the amounts of impurities contained in the aluminum bare metal.

<Samples No. 1 to No. 9>

Plate materials of samples No. 1 to No. 6 are manufactured by powder extrusion using a gas-atomized powder made of an aluminum alloy.

First, a gas-atomized powder having an average particle size of 40 μm is manufactured by an air atomization method using a molten metal of the aluminum alloy having the composition shown in Table 1.

Next, the intermediate worked material is manufactured by cold working using the gas-atomized powder. The cold working here is isotropic hydrostatic press molding. The conditions of cold working are that the temperature is ambient temperature and the pressure is 200 MPa. The intermediate worked material is a column-shaped molded body having a diameter of ϕ42 mm and a length of 40 mm.

Next, a flat plate-shaped extruded material is manufactured by applying a hot extrusion working to the intermediate worked material. The extrusion conditions are that the heating temperature of the intermediate worked material is 450° C. and the extrusion ratio is 28. The intermediate worked material is heated to 450° C. then extruded. The relative density of the resulting extruded material is 99%. The relative density here is the ratio obtained by dividing the apparent density by the true density. The true density is determined from the composition of the aluminum alloy constituting the extruded material. The thickness of the extruded material is about 1.5 mm.

Next, the extruded material is subjected to a solution treatment and an aging treatment sequentially to manufacture a heat-treated material. The conditions of the solution treatment and the aging treatment are shown in Table 2. The conditions shown in Table 2, for example, "510° C.×3 h→water cooling" means that the heating temperature is 510° C., the holding time of the heating temperature is 3 hours, and water cooling is performed after this holding time. The conditions shown in Table 2, for example, "175° C.×16 h→air cooling" means that the heating temperature is 175° C., the holding time of the heating temperature is 16 hours, and air cooling is performed after this holding time.

The plate materials of samples No. 7 to No. 9 are manufactured using a double-roll casting method. The cooling rate during double-roll casting is 100° C./sec or 80° C./sec. The thickness of the resulting casted plate is about 7.0 mm. The casted material is subjected to cold rolling working until the thickness of the casted material reaches 1.5 mm to manufacture a flat plate-shaped rolled material. The rolled material is subjected to a solution treatment and an aging treatment sequentially to manufacture a heat-treated material.

All of the plate materials of samples No. 1 to No. 9 are heat-treated materials as described above.

<Samples No. 101 to No. 109>

Plate materials of samples No. 101 to No. 109 are manufactured by conventional melting methods.

The plate materials of samples No. 101 and No. 109 are rolled materials. The plate materials of samples No. 101 and No. 109 are manufactured by subjecting a casted material manufactured by a melting method to rolling working. Solution treatment and aging treatment are not performed after rolling working.

The plate materials of samples No. 102 to No. 108 are heat-treated materials. The plate material of sample No. 102 is manufactured by subjecting a casted material manufactured by a melting method to a heat treatment without subjecting to a rolling working. The plate materials of samples No. 103 to No. 108 are manufactured by subjecting a casted material manufactured by a melting method to a rolling working, and then to a heat treatment. For the heat treatment of these samples, solution treatment and aging treatment are performed in order. The heat treatment conditions are shown in Table 2.

(Composition Analysis)

The composition of the plate material of each sample is determined by high-frequency inductively coupled plasma (ICP) luminescence spectrometry. The measurement results are as shown in Table 1. The aluminum alloy that constitutes the plate material of each sample contains the elements of the first group and the elements of the second group at the mass ratio shown in Table 1, and the balance is Al and inevitable impurities. The inevitable impurities are other than the elements of the first group and the elements of the second group. The mass ratio of Fe in the plate material of each sample is due to Fe contained in the aluminum bare metal used for the raw material. Fe is not added during the manufacturing process of the sample.

The aluminum alloy constituting the plate material of samples No. 4, No. 5, No. 107, and No. 108 corresponds to an alloy defined by international alloy designation 6056.

(Observation of Structure of Surface Layer Region)

The structure of the surface layer region in the plate material of each sample is examined as follows.

A cross-section perpendicular to the surface of the plate material is taken at any positions of the plate material of each sample. The cross-section is smoothly finished with a cross-sectional polisher (CP). The surface layer region of the plate material is a region from the surface of the plate material to 200 μm in the thickness direction of the plate material. For the surface layer region above, a reflected electron image is observed by an electric field emission scanning electron microscope. The microscope used for observation here is JSM-7800F manufactured by JEOL Ltd. The observation conditions are that the magnification is 1000 times, the acceleration voltage is 5 kV, and the observation region is 50 μm×100 μm. The resolution of the observation image is more than 5 pixels/μm. Regarding the acquisition positions of the observation region, 10 observation regions are arbitrarily taken from the surface layer region. That is, 10 fields of view are taken. The contrast of the image is adjusted so that a region with a brightness of 255, so-called over exposure, and a region with a brightness of 0, so-called under exposure, do not occur in the image. The reflected electron image obtained in this manner is analyzed by the following method. Note that in Test Example 1, the surface of the plate material of each sample is a surface used for contact points, for example, when the application of the plate material is a material of a terminal.

<Procedure for Image Analysis>

First, the open source image analysis software "ImageJ version 1.51 j" is started up. Next, "Saturated pixels 0.5%, Normalize" processing is performed by the "Enhance Contrast" function. Next, pixels with a brightness of 165 or more and 255 or less are selected by the "Threshold" function. This selected region is considered as a compound containing one or more elements selected from the group consisting of the elements of the first group and the elements of the second group, and Al. The number of compounds, the area of each compound, the Feret's diameter, and the minimum Feret's diameter of each compound are then determined by the "Analyze Particles" function. The equivalent circle diameter of each compound is determined from the area of each compound. The equivalent circle diameter of each compound is the diameter of a circle having the same area as the area of each compound. By using the above software, it is possible to automatically calculate the number, the area, the Feret's diameter, the minimum Feret's diameter, and the like of each compound.

<Presence or Absence of Coarse Compound>

For the 10 fields of view described above, the presence or absence of compounds having an equivalent circle diameter of 5.0 μm or more among the compounds is examined. When the number of fields of view containing compounds having an equivalent circle diameter of 5.0 μm or more out of 10 fields of view is 3 or less, it is indicated as "Absence" in Table 3. When the number of fields of view containing compounds having an equivalent circle diameter of 5.0 μm or more out of 10 fields of view is 4 or more, it is indicated as "Presence" in Table 3.

<Number Density>

For the 10 fields of view described above, a value is obtained by dividing the number of compounds having an equivalent circle diameter of 1.5 μm or more and less than 5.0 μm by the area of the observation region. The obtained value is taken as the number density. The median of the number densities obtained for the 10 fields of view is determined. This median is taken as the number density of compounds (per $\mu m^2$) in the plate material of each sample. The number density of compounds (per $\mu m^2$) is shown in Table 3.

<Area Ratio>

For the 10 fields of view described above, the sum of the areas of compounds having an equivalent circle diameter of 0.5 μm or more among the compounds is determined. The sum obtained is divided by the area of the observation region described above. The value obtained is the area ratio of the compound. The median of the area ratios obtained for the 10 fields of view is determined. This median is taken as the area ratio (%) of the compound in the plate material of each sample. The area ratio (%) of the compound is shown in Table 3. It should be noted that this area ratio of the compound can be regarded as the volume ratio of the compound as described above.

<Average Aspect Ratio>

For the 10 fields of view described above, the aspect ratio is determined by the Feret's diameter and the minimum Feret's diameter for each of the compounds having an equivalent circle diameter of 1.0 μm or more and less than 1.5 μm. The average value of the aspect ratios obtained for the 10 fields of view is determined. This average value is taken as the average aspect ratio in the plate material of each sample. The average aspect ratios of the compounds are shown in Table 3.

(Properties)

Table 3 shows the Vickers hardness (HV), conductivity (% IACS), and bending score for the plate material of each sample.

<Vickers Hardness>

Vickers hardness is measured in accordance with JIS Z 2244-1: 2020. The test load is selected so that the diagonal length of the indentation is 0.050 mm or more. A cross-section perpendicular to the surface of the plate material is taken at any positions of the plate material of each sample. The above cross-section is smoothly finished by mechanical polishing, buff polishing, CP, or the like. The Vickers hardness is measured at any positions on this cross-section. The number of measuring points is 20 points. The median of the Vickers hardness of 20 points is determined. This median value is taken as the Vickers hardness (HV) in the plate material of each sample. The measuring temperature is ambient temperature.

<Conductivity>

The conductivity is measured in accordance with JCBA T603: 2011 or JIS H 0505: 1975.

<Bending Score>

Figure 9:
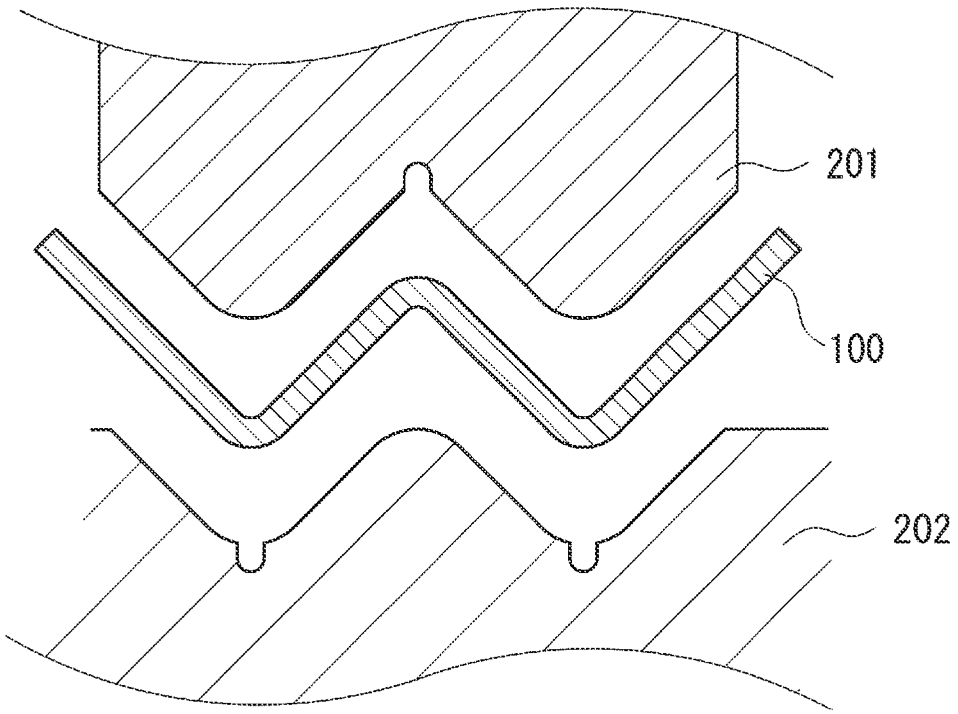
FIG. 9 is a diagram illustrating a test method of the W-bending test in Test Example 1.

The bending score is determined by performing a W-bending test in accordance with JCBA T307: 2007. First, a test specimen having a thickness of 0.8 mm, a width of 10 mm, and a length of 30 mm is manufactured by cutting and grinding the plate material of each sample. Five test specimens are prepared for each sample. The W-bending test is performed using the jig shown in FIG. 9. The jig includes an upper mold 201 having two mountain portions and a lower mold 202 having two valley portions. The test specimen 100 is sandwiched between the upper mold 201 and the lower mold 202, and subjected to W-bending working with a bending radius of 1.6 mm. After the W-bending working, the strength and weakness of wrinkles and cracks of the bent top are scored by comparing them with the evaluation criteria described in JCBA T307: 2007. The evaluation is performed by setting evaluation criterion A as 4 points, evaluation criterion B as 3 points, evaluation criterion C as 2 points, evaluation criterion D as 1 point, and evaluation criterion E as 0 points. The value obtained by averaging the scores of 5 test specimens of each sample is determined. This average value is taken as the bending score in the plate material of each sample.

TABLE 1

| Sample No. | Composition: First group: Si mass % | Mg mass % | Second group: Fe mass % | Cu mass % | Mn mass % | Cr mass % | Zn mass % | Zr mass % | Balance: Al — |
|---|---|---|---|---|---|---|---|---|---|
| 1 | 0.42 | 0.47 | 0.15 | 0.00 | 0.00 | 0.00 | 0.00 | 0.00 | Bal. |
| 2 | 0.37 | 0.58 | 0.35 | 0.00 | 0.00 | 0.00 | 0.00 | 0.00 | Bal. |
| 3 | 0.72 | 0.97 | 0.20 | 0.42 | 0.06 | 0.00 | 0.00 | 0.00 | Bal. |
| 4 | 1.06 | 0.94 | 0.16 | 0.94 | 0.88 | 0.06 | 0.17 | 0.10 | Bal. |
| 5 | 1.24 | 0.87 | 0.10 | 0.99 | 0.99 | 0.08 | 0.12 | 0.13 | Bal. |
| 6 | 1.45 | 1.25 | 0.20 | 1.42 | 1.42 | 0.10 | 0.11 | 0.10 | Bal. |
| 7 | 0.40 | 0.60 | 0.17 | 0.00 | 0.04 | 0.01 | 0.00 | 0.00 | Bal. |
| 8 | 1.09 | 0.89 | 0.22 | 0.86 | 0.92 | 0.01 | 0.14 | 0.12 | Bal. |
| 9 | 1.09 | 0.89 | 0.22 | 0.86 | 0.92 | 0.01 | 0.14 | 0.12 | Bal. |
| 101 | 0.06 | 0.00 | 0.29 | 0.00 | 0.00 | 0.00 | 0.00 | 0.00 | Bal. |
| 102 | 0.37 | 0.50 | 0.17 | 0.00 | 0.03 | 0.01 | 0.00 | 0.00 | Bal. |
| 103 | 0.37 | 0.50 | 0.06 | 0.00 | 0.00 | 0.01 | 0.00 | 0.00 | Bal. |
| 104 | 0.37 | 0.50 | 0.17 | 0.00 | 0.03 | 0.01 | 0.00 | 0.00 | Bal. |
| 105 | 0.37 | 0.58 | 0.35 | 0.00 | 0.00 | 0.01 | 0.00 | 0.00 | Bal. |
| 106 | 0.72 | 0.97 | 0.20 | 0.42 | 0.06 | 0.03 | 0.00 | 0.00 | Bal. |
| 107 | 1.07 | 0.89 | 0.16 | 0.76 | 0.60 | 0.04 | 0.20 | 0.16 | Bal. |
| 108 | 1.07 | 0.89 | 0.16 | 0.76 | 0.60 | 0.04 | 0.20 | 0.16 | Bal. |
| 109 | 0.01 | 0.01 | 0.00 | 0.00 | 0.00 | 0.00 | 0.00 | 0.00 | Bal. |

TABLE 2

| Sample No. | Manufacturing method and manufacturing condition: Basic process | Solution treatment condition | Aging treatment condition |
|---|---|---|---|
| 1 | Gas atomization and powder extrusion | 510° C. × 3 h → water cooling | 175° C. × 16 h → air cooling |
| 2 | Gas atomization and powder extrusion | 510° C. × 3 h → water cooling | 175° C. × 16 h → air cooling |
| 3 | Gas atomization and powder extrusion | 510° C. × 3 h → water cooling | 175° C. × 16 h → air cooling |
| 4 | Gas atomization and powder extrusion | 510° C. × 3 h → water cooling | 175° C. × 16 h → air cooling |
| 5 | Gas atomization and powder extrusion | 510° C. × 3 h → water cooling | 200° C. × 16 h → air cooling |
| 6 | Gas atomization and powder extrusion | 510° C. × 3 h → water cooling | 200° C. × 16 h → air cooling |
| 7 | Double-roll casting method (100° C./sec) | 510° C. × 3 h → water cooling | 175° C. × 16 h → air cooling |
| 8 | Double-roll casting method (100° C./sec) | 510° C. × 3 h → water cooling | 175° C. × 16 h → air cooling |
| 9 | Double-roll casting method (80° C./sec) | 510° C. × 3 h → water cooling | 200° C. × 16 h → air cooling |
| 101 | Melting method (casting) and rolling working | Without solution treatment | Without aging treatment |
| 102 | Melting method (casting) | 510° C. × 3 h → water cooling | 175° C. × 16 h → air cooling |
| 103 | Melting method (casting) and rolling working | 510° C. × 3 h → water cooling | 175° C. × 16 h → air cooling |
| 104 | Melting method (casting) and rolling working | 510° C. × 3 h → water cooling | 175° C. × 16 h → air cooling |
| 105 | Melting method (casting) and rolling working | 510° C. × 3 h → water cooling | 175° C. × 16 h → air cooling |
| 106 | Melting method (casting) and rolling working | 510° C. × 3 h → water cooling | 175° C. × 16 h → air cooling |
| 107 | Melting method (casting) and rolling working | 510° C. × 3 h → water cooling | 175° C. × 16 h → air cooling |
| 108 | Melting method (casting) and rolling working | 510° C. × 3 h → water cooling | 200° C. × 16 h → air cooling |

TABLE 2-continued

| Sample No. | Manufacturing method and manufacturing condition: Basic process | Solution treatment condition | Aging treatment condition |
|---|---|---|---|
| 109 | Melting method (casting) and rolling working | Without solution treatment | Without aging treatment |

TABLE 3

| Sample No. | Structure of surface layer region, Compound: 1.5 μm or more and less than 5.0 μm — Number density per μm$^2$ | 0.5 μm or more — Area ratio % | 1.0 μm or more and less than 1.5 μm — Average aspect ratio | 5 μm or more Presence or absence — Presence or absence | Properties: Vickers hardness HV | Conductivity % IACS | Bending score |
|---|---|---|---|---|---|---|---|
| 1 | 0.0000 | 0.15 | 1.4 | Absence | 73 | 56 | 4.0 |
| 2 | 0.0000 | 0.18 | 1.4 | Absence | 70 | 57 | 4.0 |
| 3 | 0.0000 | 0.16 | 1.4 | Absence | 106 | 43 | 4.0 |
| 4 | 0.0000 | 0.41 | 1.4 | Absence | 120 | 43 | 4.0 |
| 5 | 0.0000 | 0.41 | 1.4 | Absence | 105 | 49 | 4.0 |
| 6 | 0.0000 | 0.63 | 1.4 | Absence | 123 | 41 | 4.0 |
| 7 | 0.0005 | 0.32 | 2.1 | Absence | 81 | 51 | 4.0 |
| 8 | 0.0002 | 0.60 | 2.1 | Absence | 118 | 43 | 4.0 |
| 9 | 0.0009 | 0.60 | 2.1 | Absence | 102 | 44 | 4.0 |
| 101 | 0.0012 | 0.59 | 3.3 | Absence | 46 | 62 | 4.0 |
| 102 | 0.0002 | 1.52 | 10.0 | Presence | 75 | 56 | 0.0 |
| 103 | 0.0003 | 0.09 | 2.4 | Absence | 73 | 56 | 4.0 |
| 104 | 0.0012 | 0.32 | 3.4 | Absence | 76 | 56 | 2.8 |
| 105 | 0.0020 | 0.59 | 2.8 | Absence | 70 | 57 | 1.5 |
| 106 | 0.0012 | 0.36 | 3.2 | Absence | 106 | 43 | 2.5 |
| 107 | 0.0016 | 1.00 | 2.1 | Absence | 112 | 44 | 1.8 |
| 108 | 0.0016 | 1.00 | 2.1 | Absence | 90 | 45 | 3.0 |
| 109 | 0.0001 | 0.08 | 2.4 | Absence | 20 | 63 | 4.0 |

As shown in Table 3, the plate materials of samples No. 1 to No. 9 have a Vickers hardness of 70 HV or more and a bending score of 4.0. Such plate materials of samples No. 1 to No. 9 are excellent in strength and also excellent in bending workability. In addition, the plate materials of samples No. 1 to No. 9 have a conductivity of 40% IACS or more, and thus are also excellent in conductivity. Hereinafter, the plate materials of samples No. 1 to No. 9 are referred to as the plate materials of a specific sample group.

The plate materials of the specific sample group have higher Vickers hardness than the plate materials of samples No. 101 and No. 109 having a bending score of 4.0. One reason for this is believed that the plate materials of the specific sample group contain both silicon and magnesium, but the plate material of sample No. 101 does not contain magnesium, and the plate materials of the specific sample group have greater contents of silicon and magnesium than the plate material of sample No. 109. Another reason is believed that the plate materials of the specific sample group contain the elements of the second group in addition to the elements of the first group. It should be noted that it is believed that the conductivity of samples No. 101 and No. 109 is high because the total content of the elements of the first group and the elements of the second group is small.

Figure 8:
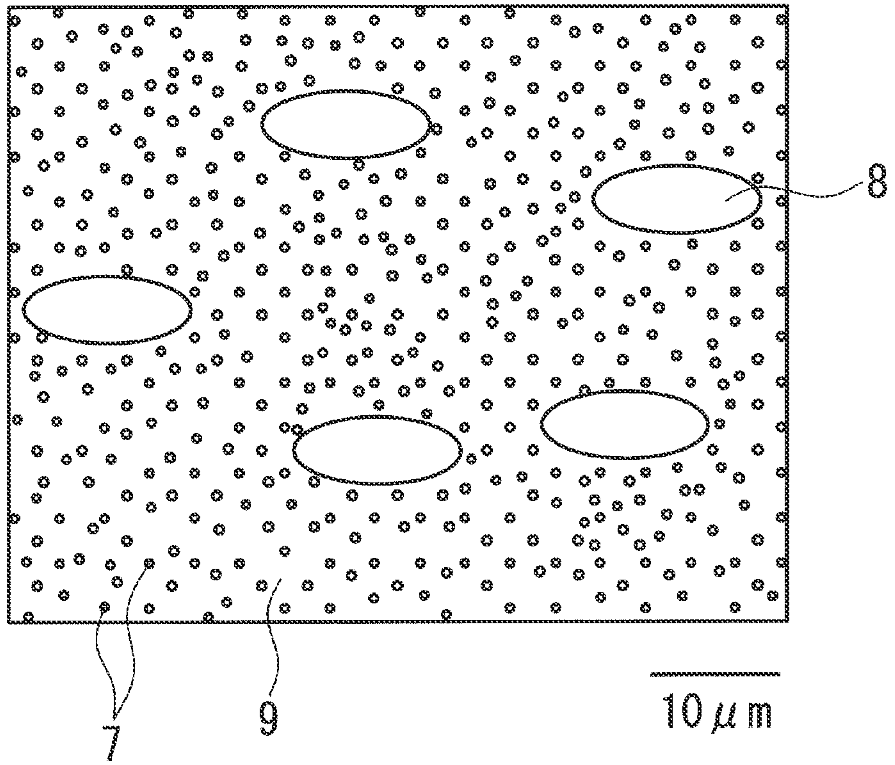
FIG. 8 is a schematic diagram illustrating a structure of an aluminum alloy manufactured by a melting method.

The plate materials of the specific sample group have a higher bending score than the plate materials of samples No. 102 and No. 104 to No. 108 that have a Vickers hardness of 70 HV or more. One reason for this is believed that the structure of the surface layer region is different. The plate materials of the specific sample group contain substantially no coarse compound 8 having an equivalent circle diameter of 5 μm or more in surface layer region 10 as shown in FIG. 2. The plate material of sample No. 102 contains coarse compound 8 having an equivalent circle diameter of 5 μm or more as shown in FIG. 8. The coarse compound 8 is believed to lower the bending score as a result of reducing toughness because it becomes the starting point of cracking or wrinkles during W-bending working. In addition, the number density of the compound of the plate materials of the specific sample group is 0.0010 per $\mu m^2$ or less, which is small compared to the number density of the plate materials of samples No. 104 to No. 108. Furthermore, the area ratio of the compound is less than 1.0% in the plate materials of the specific sample group, which is small compared to the area ratio of the plate materials of samples No. 102, No. 107, and No. 108. Since the plate materials of the specific sample group substantially do not contain the coarse compounds and contain few compounds having an equivalent circle diameter of 1.5 μm or more and less than 5.0 μm, it is believed that the plate materials of the specific sample group are difficult to have cracks during W-bending working. It is believed that compounds having an equivalent circle diameter of 1.5 μm or more do not substantially contribute to the improvement of strength but affect bending workability. The plate materials of the specific sample group have an average aspect ratio of 2.5 or less for compounds having an equivalent circle diameter of 1.0 μm or more and less than 1.5 μm, and the shape of the compounds is close to a circle. Since the somewhat larger compounds have a shape difficult to become the starting point of cracking or wrinkles, it is believed that the plate materials of the specific sample group are difficult to have cracks during W-bending working. In addition, it is believed that the plate materials of the specific sample group have high Vickers hardness because the plate materials of the specific sample group contain the elements of the first group and the elements of the second group so that the compounds having an equivalent circle diameter of 0.5 μm or more are contained to some extent. It is further believed that the plate materials of the specific sample group have a high conductivity because at least a part of the elements of the first group and the elements of the second group are compounds. The left and right directions in FIG. 2 correspond to the extrusion direction or the rolling direction.

The composition of the compound can be analyzed, for example, by energy-dispersive X-ray spectroscopy (EDX). The compound having an equivalent circle diameter of 0.5 μm or more is typically a compound containing one or more elements selected from the group consisting of the elements of the first group and the elements of the second group, and Al.

The plate material of sample No. 103 has a number density of the compounds of 0.0010 per $\mu m^2$ or less, the area ratio of the compounds of less than 0.10%, and the Vickers hardness and bending score of the same level as the plate materials of the specific sample group. However, manufacturing of the plate material of sample No. 103 requires high-purity aluminum bare metal as the raw material. The plate materials of the specific sample group are superior in manufacturability to the plate material of sample No. 103 from the point that they can be manufactured with low-purity aluminum bare metal.

From the above descriptions, it was shown that the aluminum alloy plate composed of an aluminum alloy containing silicon and magnesium and satisfying the above conditions (a) to (c) in the cross-section of the surface layer region is excellent in strength and also excellent in bending workability. The aluminum alloy plate that further satisfies condition (d) is more excellent in strength and bending workability. The terminals formed from such aluminum alloy plates are excellent in strength and also excellent in bending workability. It was also shown that the above-mentioned aluminum alloy plate can be manufactured by using a solidified material obtained by rapidly cooling and solidifying a molten metal.

The present invention is not limited to these examples, but is indicated by the claims, and is intended to include all modifications within the meaning and scope of the claims and equivalents thereto.

For example, in Test Example 1, the content of elements of the first group, the content of elements of the second group, manufacturing conditions, and the like can be modified. Examples of the manufacturing conditions include the manufacturing methods and manufacturing conditions of the solidified materials, the average particle size of the solidified materials, the temperature and pressure at the time of press molding, the extrusion conditions, the heating temperature and holding time at the time of heat treatment, and the cooling rate of double-roll casting.

REFERENCE SIGNS LIST

- 1 terminal, 1A crimp terminal, 1B female terminal, 1C male terminal
- 2 electric wire
- 3 electric wire with terminal
- 4 aluminum alloy plate, 40 surface
- 7, 8 compound, 9 mother phase, 10 surface layer region
- 11, 12 connection portion, 11B spring portion
- 13 insulation barrel portion
- 20 conductor, 23 insulating layer
- 100 test specimen, 201 upper mold, 202 lower mold

The invention claimed is:

1. An aluminum alloy plate made of an aluminum alloy, the aluminum alloy containing 0.01 mass % or more and 1.50 mass % or less of silicon, 0.01 mass % or more and 2.00 mass % or less of magnesium, 0 mass % or more and 1.50 mass % or less of iron,
0 mass % or more and 1.50 mass % or less of copper,
0 mass % or more and 1.50 mass % or less of manganese,
0 mass % or more and 1.50 mass % or less of chromium,
0 mass % or more and 1.50 mass % or less of zinc,
0 mass % or more and 1.50 mass % or less of zirconium, and
0 mass % or more and 1.50 mass % or less of titanium,
with the balance being aluminum and inevitable impurities, wherein
the aluminum alloy in a cross-section of a surface layer region of the aluminum alloy plate contains a plurality of compounds, each of the plurality of compounds containing one or more elements selected from the group consisting of silicon, magnesium, iron, copper, manganese, chromium, zinc, zirconium, and titanium, and aluminum,
the surface layer region is up to 200 μm from a surface of the aluminum alloy toward an inside of the aluminum alloy,
a number of fields of view containing the plurality of compounds having an equivalent circle diameter of 5 μm or more out of ten fields of view extracted from the cross-section is 3 or less,
a size of each of the ten fields of view is 50 μm×100 μm,
a number density of each of the plurality of compounds having an equivalent circle diameter of 1.5 μm or more and less than 5.0 μm is 0.0010 per $\mu m^2$ or less, and
an area ratio of the plurality of compounds having an equivalent circle diameter of 0.5 μm or more is 0.1% or more and less than 1.0%.

2. The aluminum alloy plate according to claim 1, wherein an average aspect ratio of each of the plurality of compounds having an equivalent circle diameter of 1.0 μm or more and less than 1.5 μm is 2.5 or less.

3. The aluminum alloy plate according to claim 1, wherein a Vickers hardness is 70 HV or more.

4. The aluminum alloy plate according to claim 1, wherein a Vickers hardness is 72 HV or more and 160 HV or less.

5. The aluminum alloy plate according to claim 1, wherein a conductivity is 40% IACS or more and 63% IACS or less.

6. The aluminum alloy plate according to claim 1, wherein in each of the plurality of compounds a content of each element of iron, copper, manganese, chromium, zinc, zirconium, and titanium is 0.01 mass % or more.

7. The aluminum alloy plate according to claim 1, wherein the aluminum alloy is an alloy defined by international alloy designation 6056, and
a Vickers hardness is 72 HV or more, and
a conductivity is 40% IACS or more and 53% IACS or less.

8. A terminal formed from the aluminum alloy plate according to claim 1.

9. An electric wire with terminal, comprising an electric wire and the terminal according to claim 8.

10. A bus bar formed from the aluminum alloy plate according to claim 1.

11. The aluminum alloy plate according to claim 1, wherein the plurality of compounds are one of a compound of Al and Mg, a compound of Al and Fe, a compound of Al, Fe, and Mn, a compound of Al, Mg, and Cu, a compound of Al and Cu, a compound of Al, Fe, and Si, a compound of Al, Fe, Mn, and Si, a compound of Al, Mg, Cu, and Si, or a compound of Al, Cu, and Si.

* * * * *